(12) United States Patent  (10) Patent No.: US 8,550,475 B2
Chauza                    (45) Date of Patent:     Oct. 8, 2013

(54) PIVOTAL REFUELING TRAY FOR A HANDCART

(76) Inventor: Roger N. Chauza, Coppell, TX (US)

( * ) Notice: Subject to any disclaimer, the term of this patent is extended or adjusted under 35 U.S.C. 154(b) by 0 days.

(21) Appl. No.: 13/401,578

(22) Filed: Feb. 21, 2012

(65) Prior Publication Data

US 2012/0139201 A1    Jun. 7, 2012

Related U.S. Application Data

(63) Continuation-in-part of application No. 11/595,245, filed on Nov. 10, 2006, now Pat. No. 8,118,318.

(60) Provisional application No. 60/735,943, filed on Nov. 10, 2005.

(51) Int. Cl.
    *B62B 1/06* (2006.01)

(52) U.S. Cl.
    USPC ..................... 280/47.19; 280/47.26

(58) Field of Classification Search
    USPC .......... 280/47.17, 47.18, 47.19, 47.23, 47.24, 280/47.26, 47.27, 47.131, 47.28, 47.29, 280/47.34, 47.35, 652, 654
    See application file for complete search history.

(56) References Cited

U.S. PATENT DOCUMENTS

| | | | |
|---|---|---|---|
| 568,781 A | 10/1896 | Mahon | |
| 763,855 A | 6/1904 | Chariehois | |
| 1,220,640 A | 3/1917 | Kelly | |
| 1,647,565 A * | 11/1927 | Furlong | 222/166 |
| 1,816,411 A * | 7/1931 | Tidlinger | 220/213 |
| 2,043,896 A | 6/1936 | Larsen et al. | |
| 2,324,747 A | 7/1943 | Weissert | |
| 3,270,901 A | 9/1966 | Ord | |
| 3,930,630 A | 1/1976 | Wulff | |
| 3,997,181 A | 12/1976 | Jaco et al. | |
| 4,102,367 A | 7/1978 | Shulman et al. | |
| 4,106,648 A | 8/1978 | Dickson | |
| 4,144,915 A | 3/1979 | Henderson | |
| 4,187,950 A | 2/1980 | Peet | |
| 4,193,161 A | 3/1980 | Scott | |
| 4,521,030 A | 6/1985 | Vance | |
| 4,544,173 A | 10/1985 | Kellermyer | |
| 4,756,540 A | 7/1988 | Crawford | |
| 4,797,050 A * | 1/1989 | Habicht | 414/420 |
| 4,954,037 A * | 9/1990 | Habicht | 414/389 |
| 4,974,800 A | 12/1990 | Tyson, Jr. | |

(Continued)

OTHER PUBLICATIONS

Gas Caddy Portable Fueling Station, Overtons Product Brochure, p. 58 (undated).

*Primary Examiner* — Paul N Dickson
*Assistant Examiner* — Bridget Avery
(74) *Attorney, Agent, or Firm* — Roger N. Chauza, P.C.

(57) ABSTRACT

A pivotal tray for holding a fuel dispenser and for pivoting the container to dispense the contents thereof. The tray includes a pair of opposing guide rails to accept a container having guide slots formed in opposing sides thereof. The engagement of the guide rails of the tray into the guide slots of the container provide removeable attachment of the container to the tray. The tray can include a front stop against which the container abuts when fully engaged within the tray. The back of the tray can also include a spring-loaded stop that can be depressed downwardly and out of the way when the container is laterally slid into the guide rails of the tray. When released, the spring-loaded stop extends upwardly to form a stop at the back of the container.

21 Claims, 16 Drawing Sheets

(56) References Cited

U.S. PATENT DOCUMENTS

| | | | |
|---|---|---|---|
| 5,154,317 A | 10/1992 | Roppolo, III | |
| 5,159,777 A | 11/1992 | Gonzalez | |
| 5,205,699 A * | 4/1993 | Habicht | 414/420 |
| 5,294,137 A * | 3/1994 | Barber et al. | 280/47.26 |
| 5,316,248 A | 5/1994 | Allen | |
| 5,374,019 A | 12/1994 | Fischer | |
| 5,379,814 A * | 1/1995 | Posly | 141/351 |
| 5,593,271 A | 1/1997 | Hall | |
| 5,595,395 A | 1/1997 | Wilson | |
| 5,845,915 A | 12/1998 | Wilson | |
| 5,938,396 A | 8/1999 | Audet | |
| 6,047,866 A | 4/2000 | Brown | |
| 6,454,281 B1 | 9/2002 | Pearson | |
| D464,850 S | 10/2002 | Nelson | |
| 6,553,985 B1 | 4/2003 | Gafford | |
| 6,634,659 B2 | 10/2003 | Sanskrit | |
| 6,644,907 B1 * | 11/2003 | Pinder | 414/424 |
| 6,863,489 B2 | 3/2005 | Grubbs et al. | |
| 7,389,563 B2 | 6/2008 | Martinez et al. | |
| 7,669,738 B1 | 3/2010 | Byers | |
| 2006/0124807 A1 | 6/2006 | Nice | |

* cited by examiner

PIVOTAL REFUELING TRAY FOR A HANDCART

RELATED APPLICATIONS

This is a continuation-in-part of non-provisional patent application Ser. No. 11/595,245 filed Nov. 10, 2006, now U.S. Pat. No. 8,118,318 which claims the benefit of provisional application identified by Ser. No. 60/735,943 filed Nov. 10, 2005, the subject matters of which are incorporated herein by reference.

TECHNICAL FIELD OF THE INVENTION

The present invention relates in general to hand transport vehicles, and more particularly to wheeled carts for transporting containers and for dispensing liquids from the containers.

BACKGROUND OF THE INVENTION

The refueling of automobiles, trucks, SUVs and other vehicles is a relatively rudimentary task, in that the driver merely drives into the nearest service station and refuels his/her vehicle. Even on long distance travels, it is relatively easy to find service stations on interstate highways and in towns or cities near the highways.

On the other hand, there are other vehicles where refueling is more difficult. For example, owners of boats and personal water craft may find it more difficult to find marinas or other facilities for refueling. In addition, many owners of boats and water craft often find that it is more cost effective to purchase automobile fuel at a service station and transport the fuel to the boat or water craft. Indeed, many boat owners use the standard five gallon plastic containers to carry gasoline from a service station to the boat. Often, three or four five-gallon containers are taken to the service station in a vehicle, filled with gas, and transported back to the boat for refueling. This works satisfactory, but it is often cumbersome to carry the five-gallon containers to the boat or other water craft, and manipulate each container to pour the contents thereof into the boat. The procedure is even more troublesome if the boat is in the water and is unstable and rocking due to wave action. This awkward situation can be readily visualized, as a person standing on the unstable boat and trying to keep the gas container oriented so as to pour the gas into the refill receptacle, occurs all to frequently.

There are commercially available gas caddys which are essentially twenty-eight gallon containers mounted on wheels. While this makes the transport of the fuel convenient, it does not allow the user to easily fill the container at a service station, and transport the container to the site of the vehicle to be refueled. The reason for this is that when the twenty-eight gallon container is placed in a vehicle and taken to the service station to be refueled, the full container cannot be easily unloaded from the vehicle and wheeled to the location of the vehicle to be refueled. This can be appreciated, as a twenty eight gallons of gasoline weighs in the neighborhood of one hundred and seventy pounds.

A similar situation occurs when refueling other vehicles that are driven be internal combustion engines. The troublesome refueling of other vehicles includes, lawn mowers, both of the self-propelled and riding type, garden tractors, chain saws, motorcycles, other sports vehicles, and even airplanes.

The burden of carrying other liquids from one location to another encompasses the same problems described above. Water, for example, is often carried in a container from a well or other water source to water animals or to water plants, trees or a garden. The person cannot normally carry more than two five gallon buckets at a time, or for a very long distance, before having to dispense the water or stop and rest. There are also many industrial situations in which liquids are required to be carried from one location to another by a person.

From the foregoing, it can be seen that a need exists for a method of transporting and refueling boats, other vehicles and fuel-powered machines. A need exists for a fixture for holding a container of fuel, and allowing the container to be rotated by the user to pour the contents of the fuel into the boat without the user having to hold or otherwise support the weight of the fuel container during the refueling process. Another need exists for a fixture that is constructed so that the pivot of the container is such that if released by the user, the fuel container returns to its upright position to eliminate spillage of the fuel.

Another need exists for a wheeled cart adapted for holding a liquid container for transport from one location to another, and to easily dispense the liquid while the container remains attached to the wheeled cart. Another need exists for allowing attachment and detachment of the container to the wheeled cart, and for rearrangement of the containers on the wheeled cart for dispensing the liquid from a full container attached at an elevated position in the wheeled cart.

Yet another need exists for a fixture for securing thereto a liquid container, and for allowing easy tilting of the container in the fixture to dispense the liquid from the container.

SUMMARY OF THE INVENTION

In accordance with the principles and concepts of the invention, there is disclosed a fixture for holding a container therein, where the fixture is pivotal for dispensing a liquid from the container.

In accordance with an important feature of the invention, the fixture is mounted to a hand cart for transport and for dispensing liquid from the container to the side of the hand cart.

In accordance with another aspect of the invention, the fixture is adapted for mounting to a pole or a flat surface.

According to another feature of the invention, the fixture includes a tray adapted for holding a container, where the tray is pivotal from a rest position, and when released, the tray and container secured therein automatically return to the rest position.

In accordance with one embodiment of the invention, disclosed is a fixture for holding a container. The fixture includes a tray on which the container rests, and a support for fastening the fixture to an object. The fixture further includes a pivotal connection between the tray and the support, whereby when the tray is pivoted, liquid can be dispensed from the container.

In accordance with another embodiment of the invention, disclosed is a fixture for holding a container, including a wheeled cart, and a tray for holding a container. The fixture further includes a first support attached to the cart, where the first support including means for providing pivotal movement to the tray. A second support is attached to the cart, and the second support includes means for providing a rest support for the tray in a rest position.

According to yet another embodiment of the invention, disclosed is a fixture for holding a container, including a fuel container having a spout and having a handle for carrying the container. A pivotal tray is adapted for holding the container, and means for attaching the container to the tray is provided so that when the tray is pivoted, the container remains attached to the tray. Further included is means for pivoting the tray with respect to a fixture support, and a handle for grasping by a user of the fixture. The handle is adapted for moving the tray about the means for pivoting.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
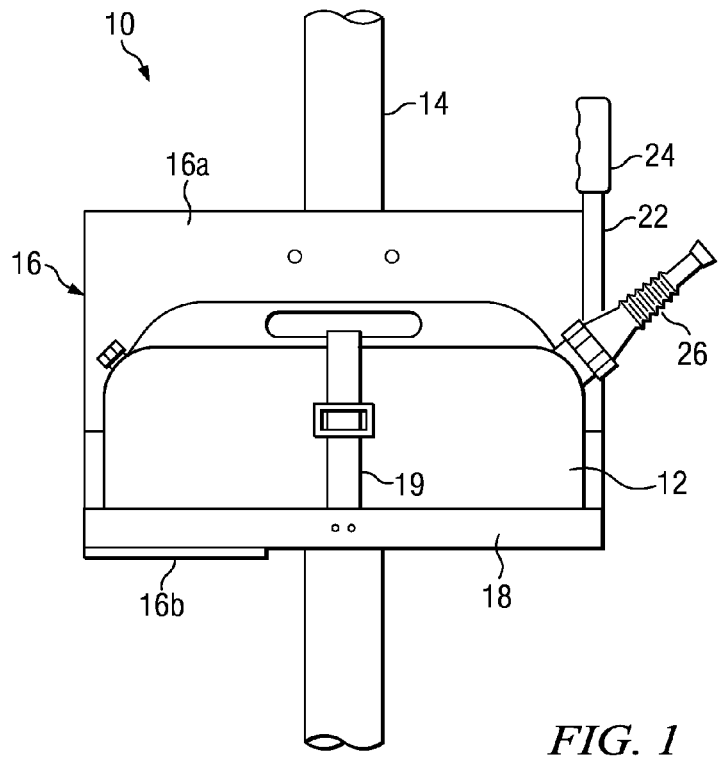
FIG. 1 is a frontal view of a fixture for holding a fuel container and for allowing pivotal movement of the same for dispensing fuel.
Figure 2:
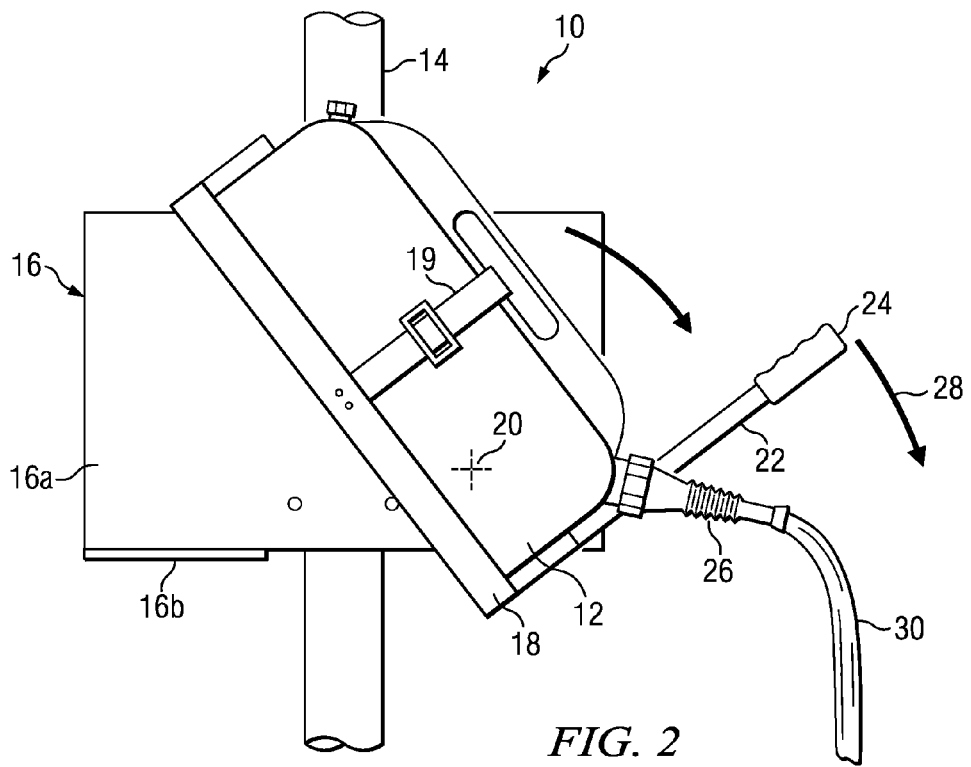
FIG. 2 is a frontal view of the fixture of FIG. 1, showing the pivotal movement of the fuel container during the refueling process.

With reference to FIG. 1, there is shown a fixture 10 for supporting a fuel container 12. FIG. 2 illustrates the fixture 10 that allows a user to pivot the fuel container to refuel a vehicle, such as a boat or other water craft, a lawn mower, an ATV, a motorcycle, fixed or portable gas generator or a host of other internal combustion engine equipped apparatus which requires fuel. While the preferred embodiment contemplates the use of containers for carrying fuel, it is also within the ambit of the invention to employ containers for carrying and dispensing other liquids, such as water, milk, paint, oil, wastes, etc.

The fixture 10 shown in FIG. 1 is illustrated mounted to a metal pole 14, such as a pole that supports the roof of a boat slip. The fixture 10 can be mounted to any other object, as needed by the user of the invention. According to the embodiment shown in FIG. 1, the fixture 10 includes a mounting plate 16 to which a tray 18 is pivotally mounted. The mounting plate 16 is fastened to another object, such the pole 14, to a hand cart as described below, or any other stationary or mobile object. The mounting plate 16 and the tray 18 are preferably constructed of metal, although rigid synthetic materials can be employed.

The mounting plate 16 includes a vertical base plate 16a and a horizontal rest plate 16b formed orthogonal to the base plate 16a. Preferably, the rest plate 16b does not extend the entire horizontal length of the base plate 16a. The base plate 16a in the illustrated embodiment pivotally supports the tray 18, and the rest plate 16b provides a member upon which the tray 18 rests in its rest or unpivoted position when fuel is not being dispensed.

The tray 18 can be planar, or other configurations suitable for the uses described herein, and other uses. The tray 18 of FIG. 1 includes a floor and one or more upright sides forming a recessed area for holding the container 12 so that the container 12 does not slide or move when situated in the tray 18. In other words, the tray 18 preferably has a shape or footprint substantially the same as that of the container 12. The upright sides of the tray, and preferably the front upright, prevents the container from sliding during dispensing of the fuel when the container 12 is pivoted, as shown in FIG. 2. The fuel container 12 can be secured to the tray 18 by a strap 19, the ends of which are fastened to the opposing uprights of the tray 18. The other end of one strap is threaded through the opening in the container which defines the handle, and fastened to the other strap using a clip, or other conventional apparatus for fastening straps together and for quick release. The point of pivotal connection between the mounting plate 16 and the tray 18 is shown by a cross 20 in FIG. 2. This location of pivotal action is desired so that the center of gravity of the full or partially full container 12 is shifted. This provides the advantage that if the user releases the container 12 from its pivotal position during refueling, the container 12 and tray 18 will return to the rest position, shown in FIG. 1. This prevents continued dispensing of the fuel in the event that the fixture 10 suddenly becomes unattended.

Attached to the front side, or right hand end of the tray 18 (shown in FIG. 1) is a handle 22. The handle 22 can be welded, bolted to or otherwise formed as part of the tray 18. In addition, the handle can be made to be telescopic or otherwise adapted for swinging or moving to a position out of the way during nonuse. The handle preferably includes a hand grip 24. When the user desires to dispense fuel form the container 12, he/she simply pulls the handle in the direction shown by arrow 28, which serves to rotate the tray 18 and the fuel container 12 fastened thereto. The fuel container 12 is then rotated to a position so that fuel is dispensed from the spout, shown as numeral 26. The user can continue to rotate the fuel container 12 during the refueling process so that fuel continues to flow by gravity from the tilted container 12. The spout 26 of the container 12 is shown connected to a flexible tubular extension 30 for coupling fuel from the spout 26 to the fuel inlet port of the vehicle (not shown) being refueled. The end of the flexible hose 30 is friction fit to the spout 26 of the container 12. As noted above, should the user decide to halt refueling, the handle 22 need simply be relaxed, whereupon the weight of the fuel remaining in the container 12, or the empty container 12 and tray 18, will cause counterclockwise rotation of the tray 18 and container 12 to the rest position. Should an emergency suddenly exist, and the user inadvertently releases his/her grip on the handle 22, the fuel container 12 and the tray 18 will automatically rotate to the rest position. As can be appreciated, the location of the axis 20 of pivotal movement can be selected to adjust the degree in which the container 18 and tray 12 will automatically return the rest position.

In order to prevent overrotation of the tray 18, various apparatus can be utilized. A pin (not shown) can be extended from the base plate 16a to function as a stop to the tray 18. The stop pin can engage a top edge of the tray in a maximum rotated position, or the stop pin can be located on the base plate 16a to engage a bottom surface or edge of the tray 18 in a maximum rotated position. Alternatively, a chain (not shown) can be attached between the base plate 16a and the handle 22 to prevent overrotation of the tray 18. As yet another alternative, the chain can be attached between the base plate 16a and the tray 18 itself to prevent overrotation. The stop mechanisms disclosed above, and even others, can be employed in all of the embodiments of the fixtures disclosed herein.

While the handle 22 is shown attached to a frontal edge of the tray 18, the handle 22 can be located in other positions on the tray 18, and oriented in rest positions other than vertically. As an alternatively, the handle 22 can be attached to the rear (left) of the tray 18 and either lifted or pushed to rotate the tray 18 in a clockwise direction.

Figure 3:
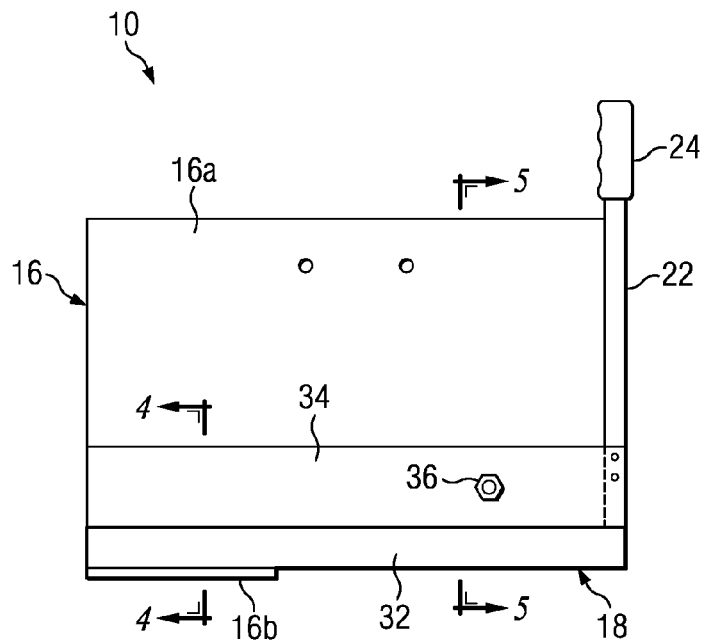
FIG. 3 is a frontal view of the fixture of FIG. 1, illustrating the components thereof in accordance with one embodiment of the invention.

With reference now to FIG. 3, there are shown the details of the tray 18 and its pivotal mount to the mounting plate 16. The tray 18 can be constructed with three uprights 32 about 2-3 inches in height, and with the side upright 34 adjacent the base plate 16a being about 6-8 inches in height. As noted above, the uprights of the tray 18 function to nest the fuel container 12 therein. The side upright 34 may be higher to accommodate the correct location of the pivotal mount to the base plate 16a. In the embodiment shown in FIG. 3, the pivotal connection between the tray 18 and the base plate 16a is by a bolt 36. The head of the bolt 36 can be welded to the tray 18, and a double nut can be used on the back side of the base plate 16a to pivotally mount the members together. Many other techniques using a bolt or pin can be employed to mount one member 18 for rotation with respect to the other member 16a.

Figure 4:
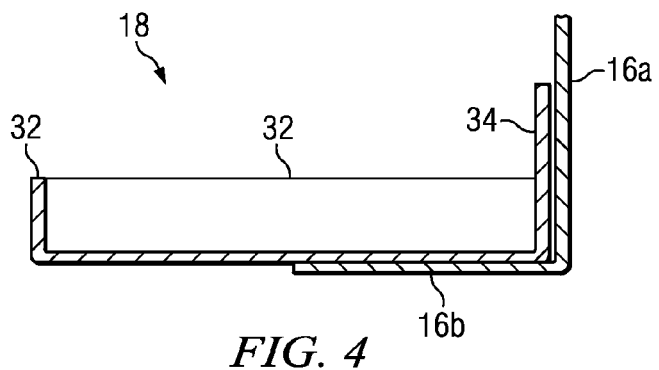
FIG. 4 is a cross-sectional view of the fixture of FIG. 3, taken along line 4-4 thereof.

FIG. 4 is a cross-sectional view of FIG. 3, showing the manner in which the tray 18 rests on the horizontal rest plate 16b of the mounting plate 16. The rest plate 16b need not extend the entire width of the tray 18, as shown, but could if desired to provide more stability. In addition, the rest plate 16b could simply be a stop member, such as a rod or bolt fixed to the base plate 16a, upon which the tray 18 abuts when in the rest position.

Figure 5:
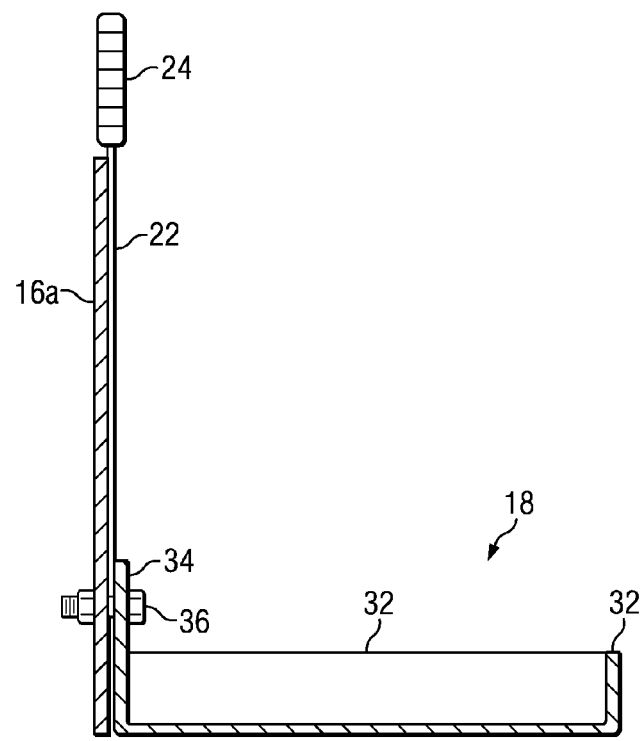
FIG. 5 is a cross-sectional view of the fixture of FIG. 3, taken along line 5-5 thereof.

FIG. 5 illustrates the manner in which the tray 18 is pivotally mounted to the base plate 16a. It should be noted that the uprights 32 need not be the same height. Those skilled in the art may find that the right-most tray upright (in FIG. 3) can be made higher to assure that the container 12 does not slide out of the tray 18 when rotated a maximum amount.

Figure 6:
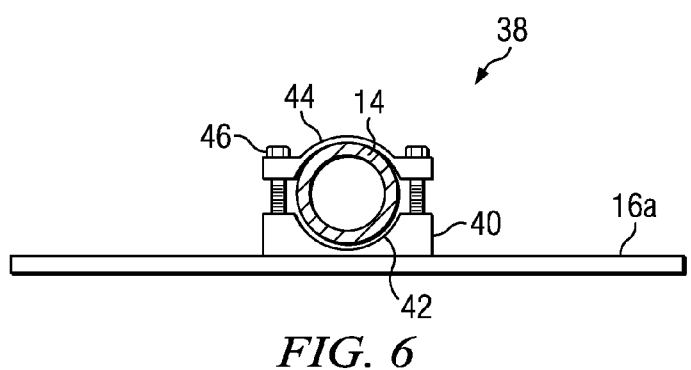
FIG. 6 is a top view of a fastening member for fastening the fixture to a vertical pole.

FIG. 6 illustrates a bracket 38 of the type that can be employed to fasten the fixture 10 to a pole 14. The illustrated bracket 38 includes a first part 40 bolted to the base plate 16a. The first part 40 is constructed with a concave portion 42 to accommodate the curvature of the pipe 14. The second part 44 is also constructed with a concave portion to fit over the pipe 14. The first and second parts 40 and 44 are bolted together with two or more bolts 46 to tighten the bracket 38 around the pipe 14. Preferably, there are two such brackets 38 fastened to the base plate 16a. The fixture 10 can thus be securely fastened to the pole 14. Those skilled in the art may find that many other fastening techniques are possible, including one or more large hose clamps adapted for clamping the base plate 16a to a pole 14. In addition, other brackets can be adapted for fastening the base plate 16a to other supports, such as flat surfaces, complex-shaped surfaces such as a hand cart, etc.

Figure 7:
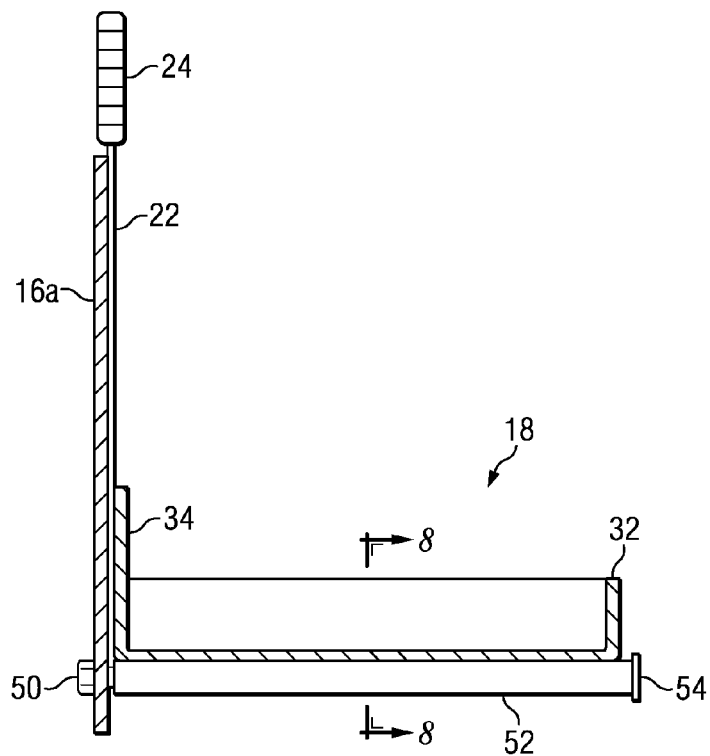
FIG. 7 is a cross-sectional view of another embodiment of the fixture, showing another method of pivotally mounting the members of the fixture together.
Figure 8:
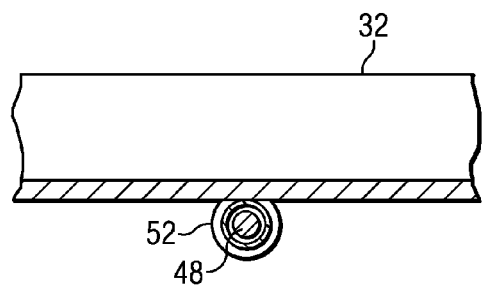
FIG. 8 is a sectional view of the pivot member, taken along line 8-8 of FIG. 7.

FIGS. 7 and 8 are cross-sectional views of another method of pivotally mounting the tray 18 to the base plate 16a. Here, an elongate rod 48 is fastened to the base plate 16a by a threaded end thereof, and a nut 50. An elongate tubular member 52 is welded or otherwise fastened to the bottom of the tray 18. The tubular member 52 of the tray 18 is slid onto the elongate rod 48 until the end of the rod 48 extends beyond the end of the tubular member 52. The tubular member 52 is captured on the rod 48 by a push nut or other fastening device or keeper 54 fastened to the exposed end of the rod 48. With this arrangement, the tray 18 can rotate about the rod 48. Again, the rod 48 can be located on the base plate 16a at a location to provide the automatic return described above. Indeed, the base plate 16a can be constructed with a number of holes therein to accommodate different pivotal positions of the rod 48 and thus the tray 18 rotationally mounted thereto.

Figure 9:
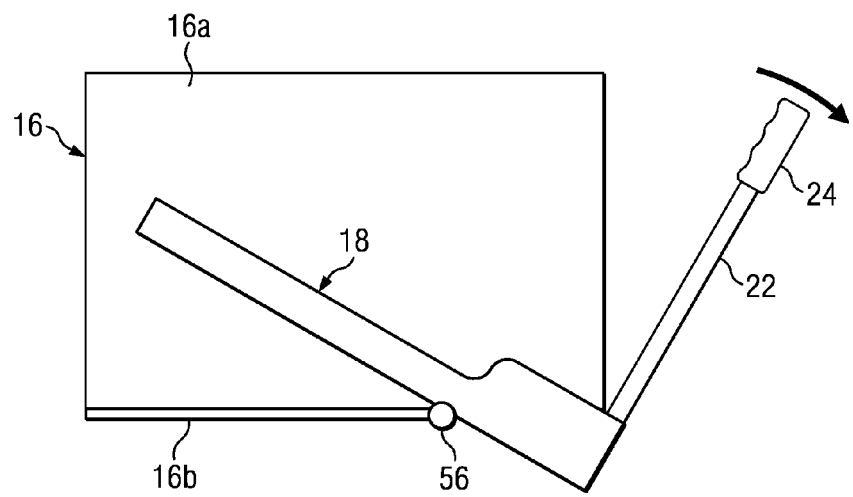
FIG. 9 is a frontal view of another embodiment of the fixture according to the invention.

FIG. 9 illustrates yet another embodiment of the invention in which the tray 18 is pivotally mounted to the mounting bracket 16. A hinge mechanism 56 is fastened to the inner edge of the rest plate 16b. The other movable part of the hinge 56 is fastened to the bottom surface of the tray 18. The tray 18 can thus pivot about the axis formed by the inner edge of the rest plate 16b. In some situations, it may be desired to mount one part of a hinge to the back edge of the tray 18 and mount the other part of the hinge to the base plate 16a, whereby the front of the tray 18 would swing downwardly. This latter option would not benefit from the automatic return of the tray 18 to a rest position. Indeed, the user would have to manipulate the handle 22 so that the tray 18 and thus the container 12 secured therein would not pivot downwardly uncontrollably.

Figure 10:
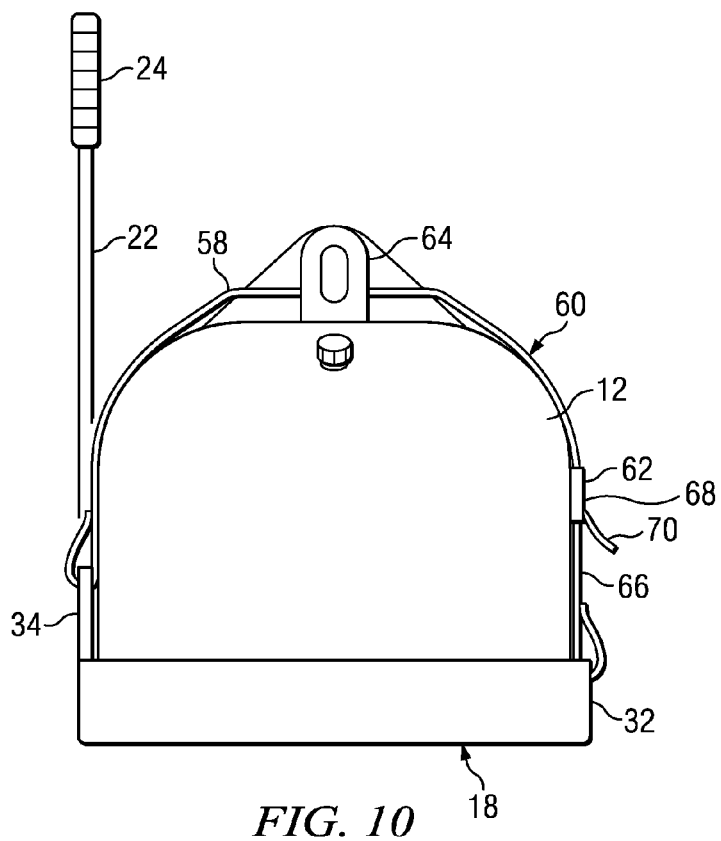
FIG. 10 is a back view of the fixture of the invention, showing one method of securing a fuel container thereto.

The container 12 can be secured to the tray 18 in a number of ways to prevent the container 12 from falling out of the tray 18 during transport of the fixture 10 and container 12, or during dispensing of the fuel. FIG. 10 illustrates a cost effective and easy way to fasten and unfasten the container 12 with respect to the tray 18. A webbed belt 60, rope, or other tether cord can be used to secure the container within the tray 18. The webbed belt 60 is essentially made in two parts. A first part 58 of the belt 60 has one end anchored to the upright 34 of the tray 18. The end of the first part 58 can be anchored by threading the same through a slot (not shown) in the upright 34 and sewn or riveted back to the belt. The other end of the belt 58 has either a male or female clasp 62, much like the type for fastening a life preserver around a person. The first part 58 of the belt 60 is threaded through the opening in the handle 64 of the container 12. The second part 66 of the belt 60 has one end anchored to the opposite upright 32 by threading through a slot in the upright 32, similar to the anchoring of the first belt part 58. The other end of the second part 66 of the belt 60 is equipped with the other of a male or female clasp 66 that mates with the counterpart clasp 62. With this arrangement, the container 12 can easily be lowered into the tray 18, and the first belt part 58 threaded through the handle opening of the container 12, and clasped to the second belt part 66. With this type of belt arrangement, the end 70 of the second belt part 66 can be pulled to cinch the belt 60 tight and keep the container 12 secured within the tray 18. Removal of the container 12 is easy, in that the clasp 62, 68 can be operated to release the belt parts from engagement, thus allowing the container 12 to be lifted from the tray 18.

Another cost effective method of securing the container 12 to the tray 18 is by the use of a bungi cord. An elastic bungi cord with hook ends can be used to secure the container 12 in the tray 18 by hooking one end of the bungi cord to the slot or hole in one side upright 34, and then stretching the bungi cord through the handle opening of the container 12 and anchoring the other hook of the bungi cord in the slot or hole in the opposite side upright 32. Multiple bungi cords can be utilized to provide additional support for securing the container 12 in the tray 18.

Figure 11:
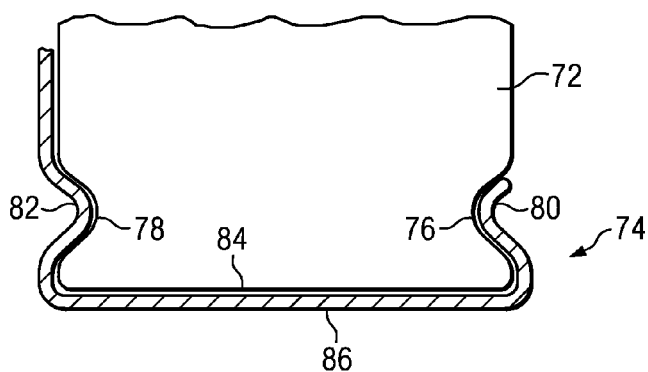
FIG. 11 is a back view of the fixture of another embodiment of the invention, showing another method of securing a fuel container thereto.

FIG. 11 is a rear view that illustrates another method of securing a container 72 to a tray 74 constructed according to another embodiment of the invention. The container 72 and the tray 74 are constructed with complementary shapes so that the container 72 is captured within the tray 74. The container 72 is molded or otherwise formed with elongate indentions or grooves 76 and 78 formed along opposite sides of the container 72. In like manner, the opposite uprights of the tray 74 are formed with corresponding shaped protrusions 80 and 82. The protrusions 80 and 82 are spaced apart to allow the container 72 to be slid horizontally into the protrusions of the tray 74. It is envisioned that the container 72 will be slid into the tray 74 from the back thereof until engaged or stopped by the frontal upright (not shown). The indentions 76 and 78 formed in the container 72, as well as the protrusions 80 and 82 formed on the tray uprights, are structured so that when the container 72 is captured in the tray 74, the bottom 84 of the container 72 rests on the floor 86 of the tray 74.

Figure 12:
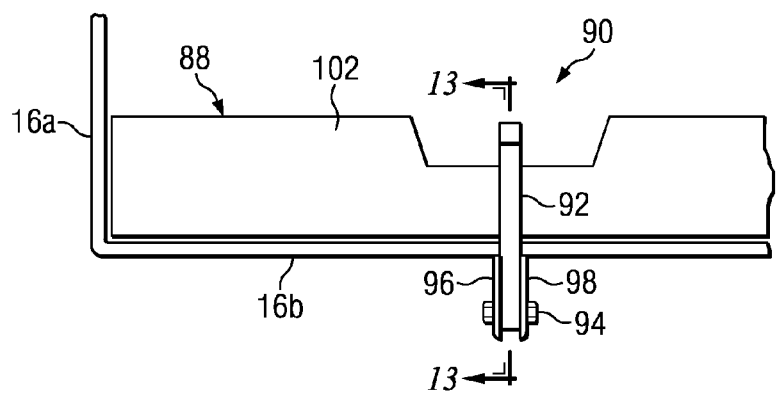
FIGS. 12 and 13 are respective end and side views of a latch for securing the members of the fixture against pivotal movement, until desired.
Figure 13:
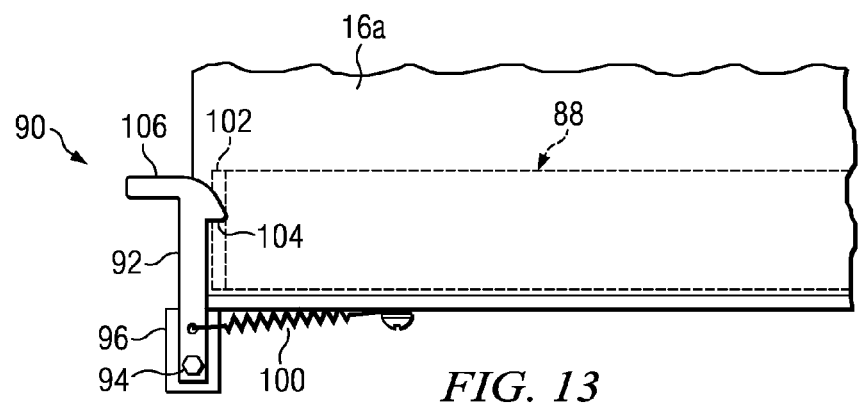

FIGS. 12 and 13 illustrate a latch mechanism 90 for latching a tray 88 to the rest plate 16b. The latch mechanism 90 provides a safety feature so that the tray 88 and the container 12 are not inadvertently rotated until the user desires the same. The latch 90 includes a dog member 92 that is pivotal about a bolt 94 that extends through spaced apart supports 96 and 98 fastened to the tray 88. A spring 100 has one end fastened to the dog 92 and the other end fastened to the bottom of the tray 88. The spring 100 biases the dog 92 toward the back upright 102 of the tray 88. The dog 92 has a catch 104 that engages with the upper edge of the back upright 102 and captures the back of the tray 88 and prevents upward movement thereof. The dog 92 has a release lever 106 which, when pressed down by the user, rotates the catch 104 away from the top edge of the upright 102, thus releasing the latch mechanism 90 and allowing the tray 88 and the container 12 held therein to be rotated so that the fuel can be dispensed.

Many other catch mechanisms can be employed with equal effectiveness. Indeed, a spring loaded rod can be fixed to the base plate 16a and allowed to be inserted into a hole in the tray to capture the components together. When it is desired by the user to release the tray, the rod can be pulled against the spring bias and disengaged from the tray, thus allowing pivotal movement thereof Other rotatable catch members known to those skilled in the art can be employed, whereby in one position, the tray is captured to the base member, and when rotated to another position, the tray is released.

Figure 14:
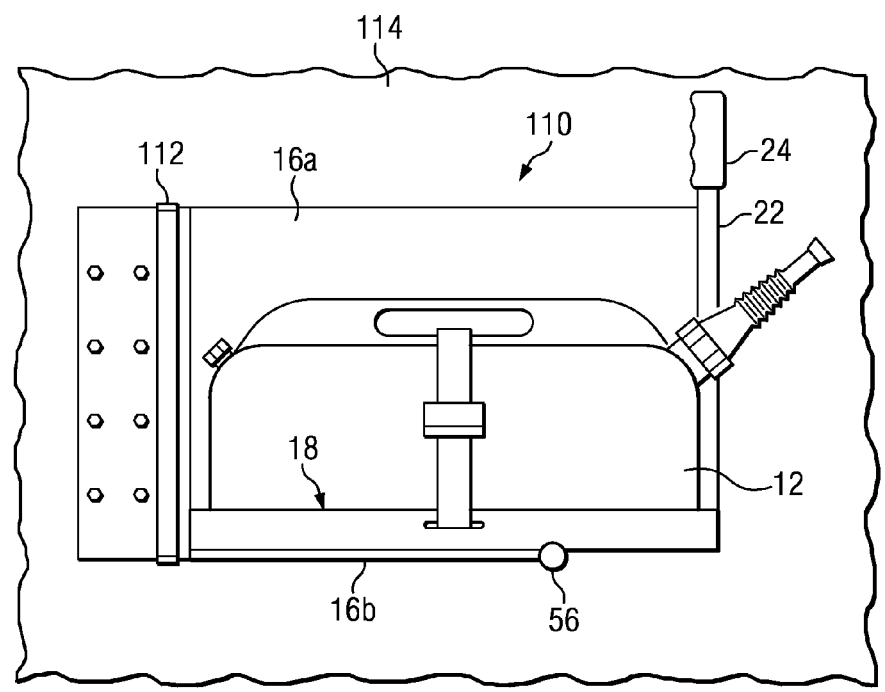
FIGS. 14 and 15 illustrate another embodiment of the invention showing a method of pivoting the fixture with respect to a fixed object.
Figure 15:
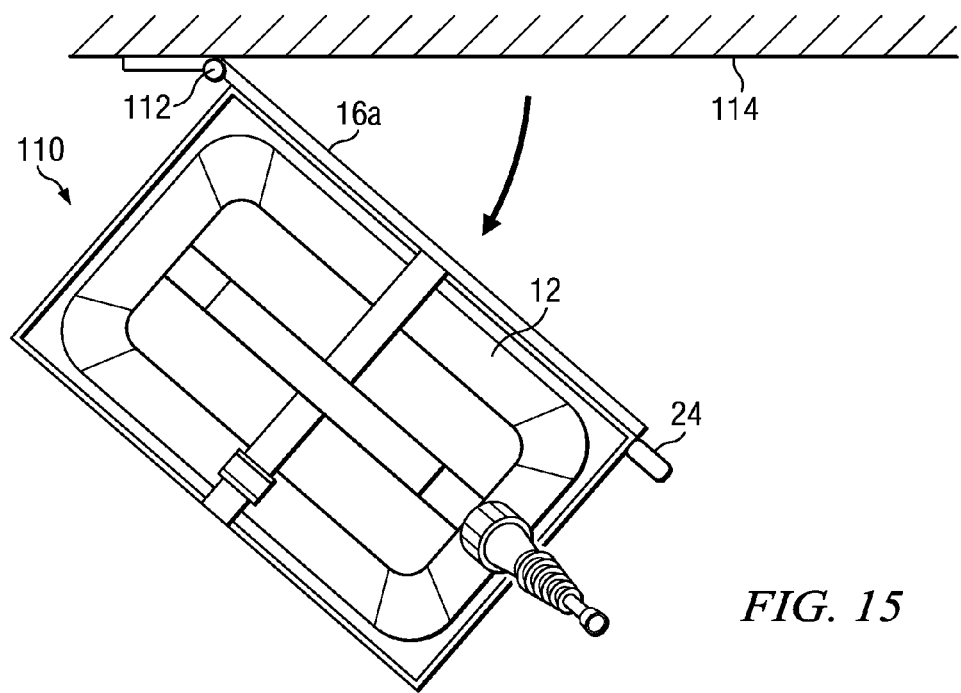

The embodiment illustrated in FIGS. 1 and 2 is adapted for attachment to a pole. The invention is not limited to such type of attachment. Rather, the fixture 10 can be attached directly to a flat surface, such as a wall. The base plate 16a can be attached to a wall by screws, or the like. Moreover, as shown in FIGS. 14 and 15, the fixture 110 can be attached to a surface 114 by a hinge 112. One part of the hinge 112 can be fastened to the wall 114 by screws or bolts, and the other part of the hinge 112 can be fastened to the base plate 16a. In this manner, the fixture 110 can be swung against the wall 114 for stowing when not in use, and swung outwardly as shown in FIG. 15 when it is desired to utilize the fixture 110 for refueling a boat or other equipment having an internal combustion engine requiring fuel. While not shown, the fixture 110 can be equipped with a latch for securing the same to the wall, and then manually released when it is desired to swing the fixture 110 outwardly.

Figure 16:
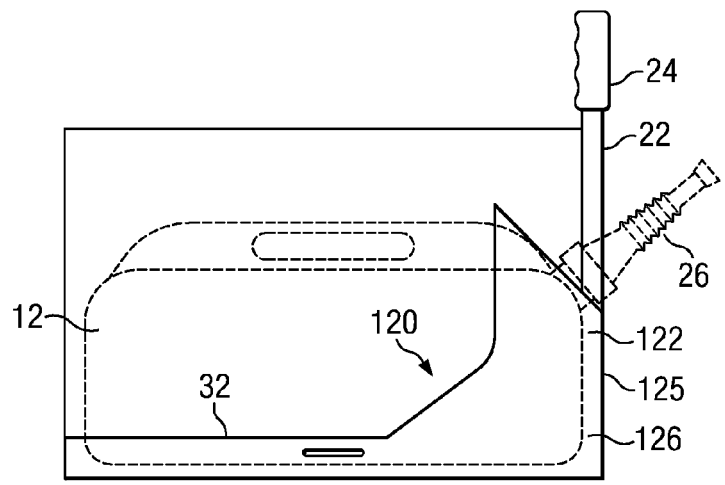
FIGS. 16 and 17 illustrate respective side and top views of another embodiment of a tray constructed with a shroud to secure a container therein.
Figure 17:
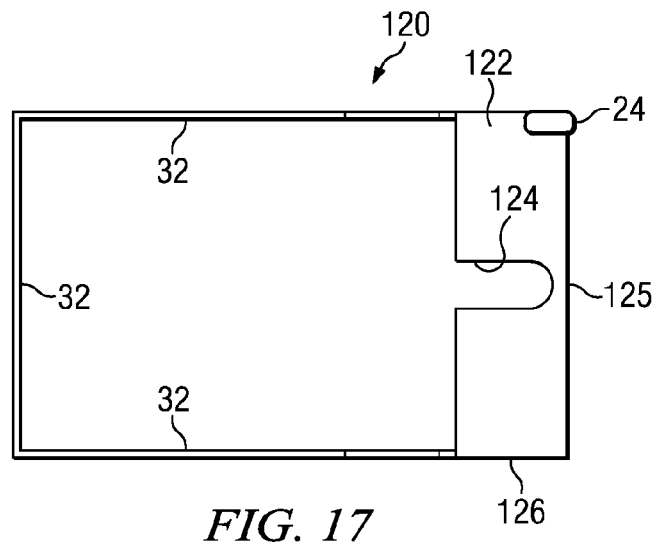

The tray 18 can be constructed so that it is not necessary to employ straps (FIG. 1) to secure the container 12 to the tray. FIGS. 16 and 17 illustrate a tray 120 constructed so that a container 12 is secured therein without the use of straps, and the like. The tray 120 includes the uprights 32 on the back and the opposing sides to laterally constrain the container 12. The tray 120 also includes a shroud 122 that forms a receptacle for a frontal portion of the container 12. The shroud 122 is shown in more detail in the top view of FIG. 17. The shroud 122 includes a slot 124 for receiving therein the spout 26 of the container 12. A front panel 125 of the shroud 122, as well as the opposing sides 126 of the shroud 122, and the bottom of the tray 120 form an enclosure for capturing the frontal portion of the container 12 therein.

The container 12 is inserted and captured in the tray 120 by tilting the front end thereof and inserting the frontal portion of the container 12 into the shroud 122. Once the spout 26 is fully inserted into the slot 124, the rear portion of the container 12 can be lowered into a nested position between the tray uprights 32. The container 12 can then be rotated by use of the handle 22 of the tray 120 to dispense fuel therefrom. As the tray 120 is rotated in a clockwise manner during dispensing of the fuel, the container 12 will move into full engagement against the shroud 122, but will not fall out of the tray 120. During transport of the container 12 in the fixture, to be described below in connection with a hand cart, the container 12 is secured and is not jolted or dislodged from the tray 120.

While a shroud 122 may be utilized to secure the container 12 in the tray 120, the tray 120 itself could be constructed as a box with an open top for lowering the container 12 therein. The box tray would have three or four sides much higher than depicted so that the container 12 would not fall out of the tray during transport or dispensing of the fuel. The back side of the box tray could be of lesser height to facilitate placing the container in the box tray. The features of the box tray could be incorporated with the features of the shroud 122, thereby providing additional securement of the container 12 in the tray.

Figure 18:
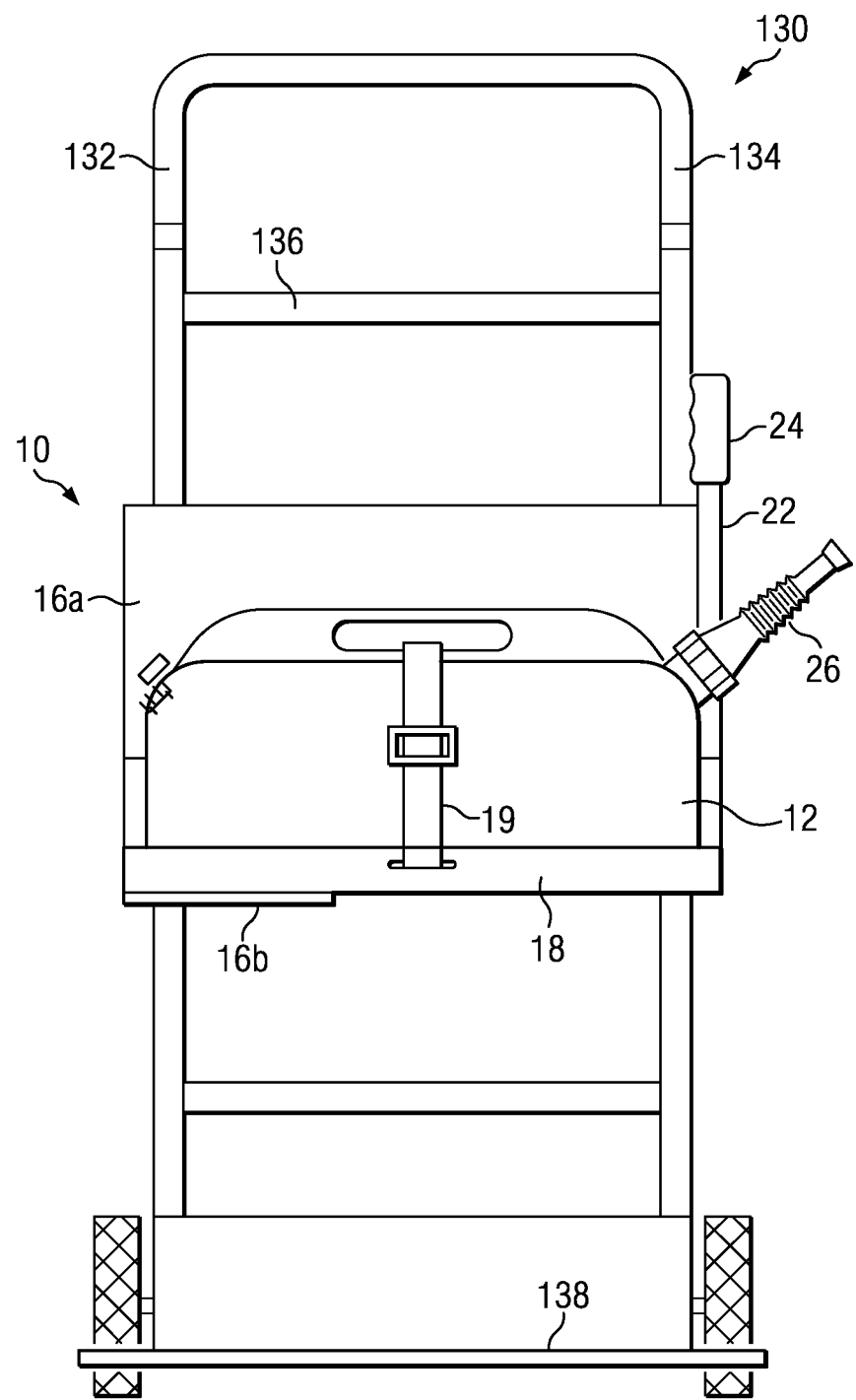
FIG. 18 is a frontal view of a fixture according to one embodiment of the invention, mounted to a hand cart for transport of the container and dispensing of liquid from the container.

FIG. 18 illustrates the tray 10 adapted for attachment to a hand cart 130 for easy transport of the container 12 of fuel from one place to another. The hand cart 130 can be used to transport the container 12 of fuel from a vehicle to the apparatus, other vehicle or machine to be refueled. In other words, one or more empty containers 12 can be carried in a vehicle to a service station to be filled with fuel. The vehicle can then be used to transport the containers 12 of fuel to a location near a boat or other vehicle to be refueled. The containers 12 can be loaded on the cart 130 and transported to the boat. The container 12 secured in the tray 18 can be readily used to refuel the boat in the manner described above. When empty, the container 12 can be removed from the tray 18 and replaced with a full container 12 and refueling can be continued until the fuel tank of the boat is full.

The fixture 10 is fastened to the cart 130 by bolting the base plate 16a to the frame uprights 132 and 134, or the cross pieces, one shown as numeral 136, or both. The fuel from the container 12 can be dispensed to the side of the hand cart 130, preferably from a long flexible tubular hose, not shown in FIG. 18. Another full container (not shown) can be strapped or otherwise fastened to the bottom platform 138 of the hand cart 130 for transport.

Figure 19:
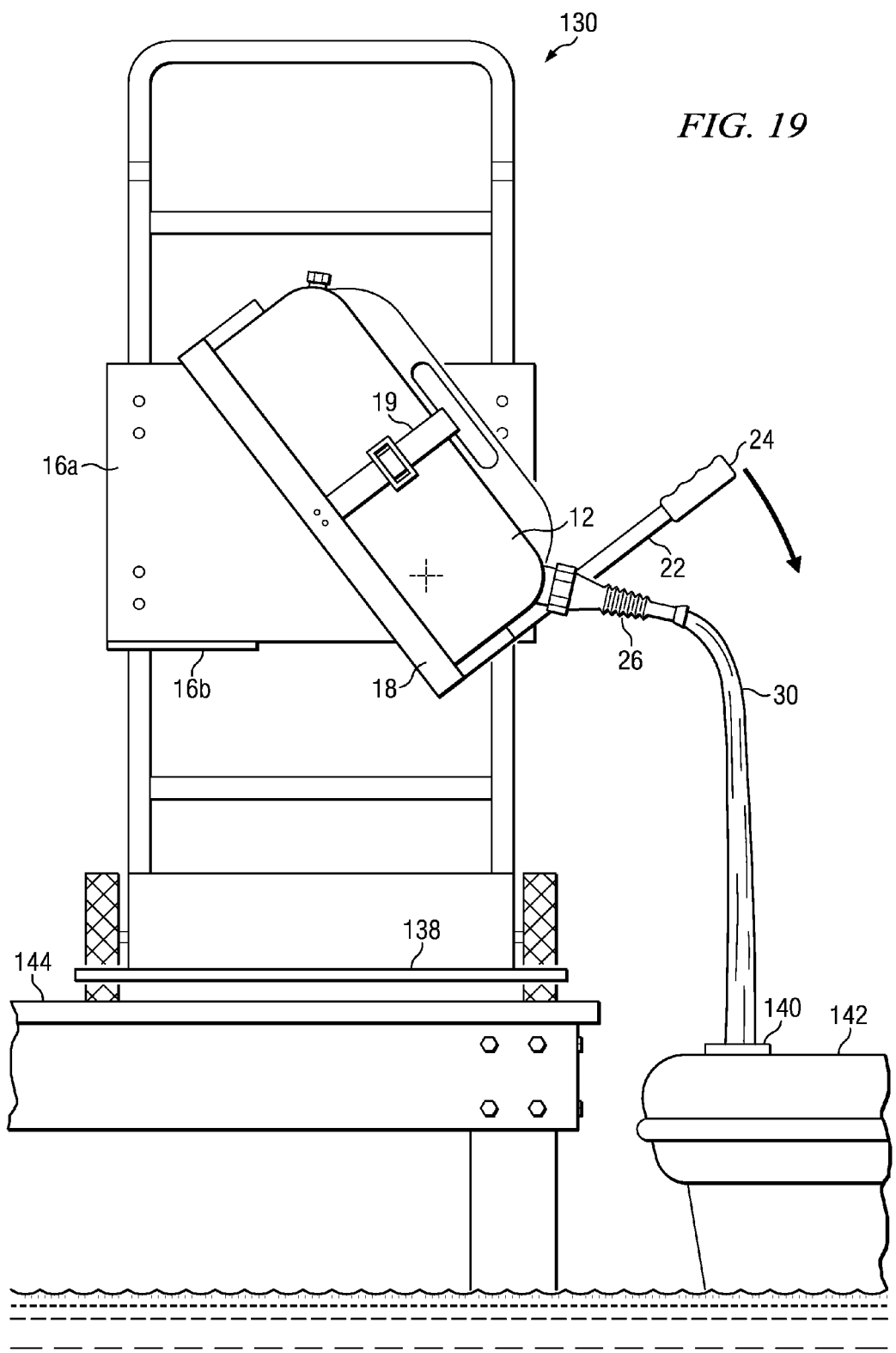
FIG. 19 illustrates the dispensing of fuel from a container secured to the fixture shown in FIG. 18.

FIG. 19 illustrates the dispensing of fuel from a container 12, secured in a fixture 10 that is mounted to the hand cart 130. The fixture 10 is adapted for holding the container 12 so that the spout is directed to a side of the hand cart 130. The fixture 10 can be constructed so that the container 12 can be tilted to either side of the hand cart 130. Indeed, those skilled in the art may find from the teachings hereof that a fixture can be constructed for tilting a container 12 both directions so that fuel can be dispensed from either the left or right side of the hand cart 130. The handle grip 24 need only be pulled by the user so as to rotate the tray 18 and thus the container 12. Shown is the use of a flexible hose extension 30 which reaches from the nozzle 26 of the container 12 to the fuel inlet 140 of a boat 142. When it is discerned by the user that the fuel tank of the boat is full, or about full, the user simply releases or pushes the handle grip 24 in a direction to rotate the container 12 back to the rest position. The use of the fixture 10 in this situation is ideal, in that the boat is generally situated lower than the dock 144 on which the hand cart 130 rests.

Figure 20:
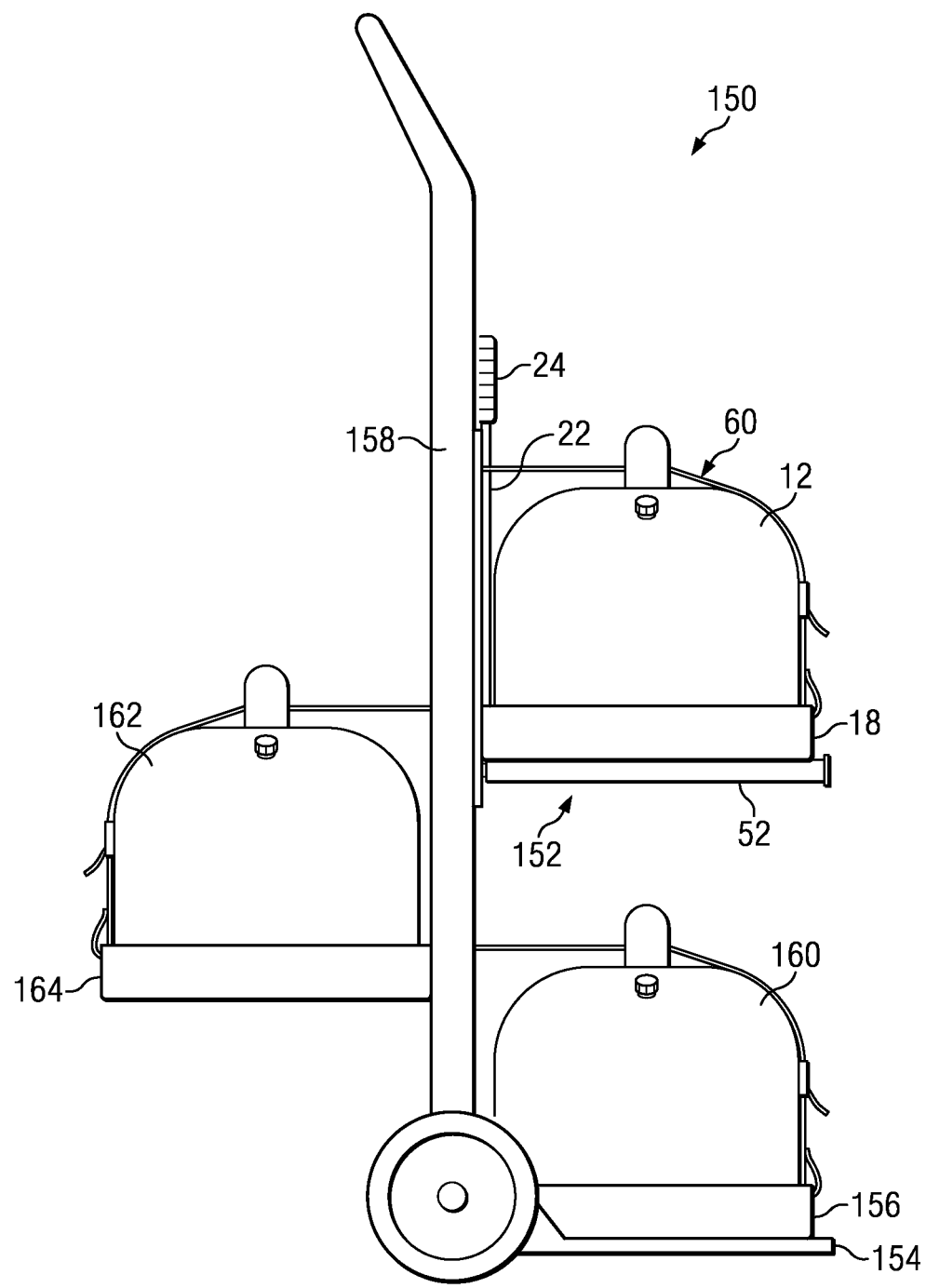
FIG. 20 is a side view of a cart adapted for carrying multiple containers of fuel, and for dispensing fuel by pivotal movement of one of the containers.

Various embodiments of the transportable fixture described above illustrate the fixture mounted to a hand cart. In order to fully utilize the features of the invention, it is entirely possible to equip a hand cart with apparatus to accommodate more than one container 12. As shown in FIG. 20, the hand cart 150 is equipped with a fixture 152 for use in transporting a container 12 of fuel and for dispensing the fuel from the container 12. The fixture 152 includes a pivotal tray 18 and many of the features described above. In addition, the hand cart 150 is equipped with a bottom lateral support 154 having a stationary tray 156 fastened thereto. The bottom lateral support 154 is fixed in a normal manner to the frame upright support 158 of the hand cart 150. A second container 160 can be secured in the tray 156 with a strap, a bungi cord or any other apparatus suitable for securement of the second container 160. While the second tray 156 is not illustrated as being pivotal for dispensing fuel from the second container 160, such tray 156 could be attached to the hand cart 150 by a pivotal connection, much like that described above.

A third container 162 can also be carried by the hand cart 150 by the utilization of a stationary tray 164 fastened to the back side of the hand cart 150. Like the other stationary tray 156, the second stationary tray 164 can be attached to either the lateral supports of the hand cart 150, or the frame upright supports of the hand cart 150, or both. It is preferred to maintain the first and second stationary trays 156 and 164 mounted in lower positions on the hand cart 150 to maintain stability during transport or refueling operations. Yet other containers could be mounted to the hand cart 150, if additional fuel carrying capacity is desired. In addition, more than one of the trays could be of the rotatable kind for dispensing fuel without moving the containers from a stationary tray to a rotatable tray.

Figure 21:
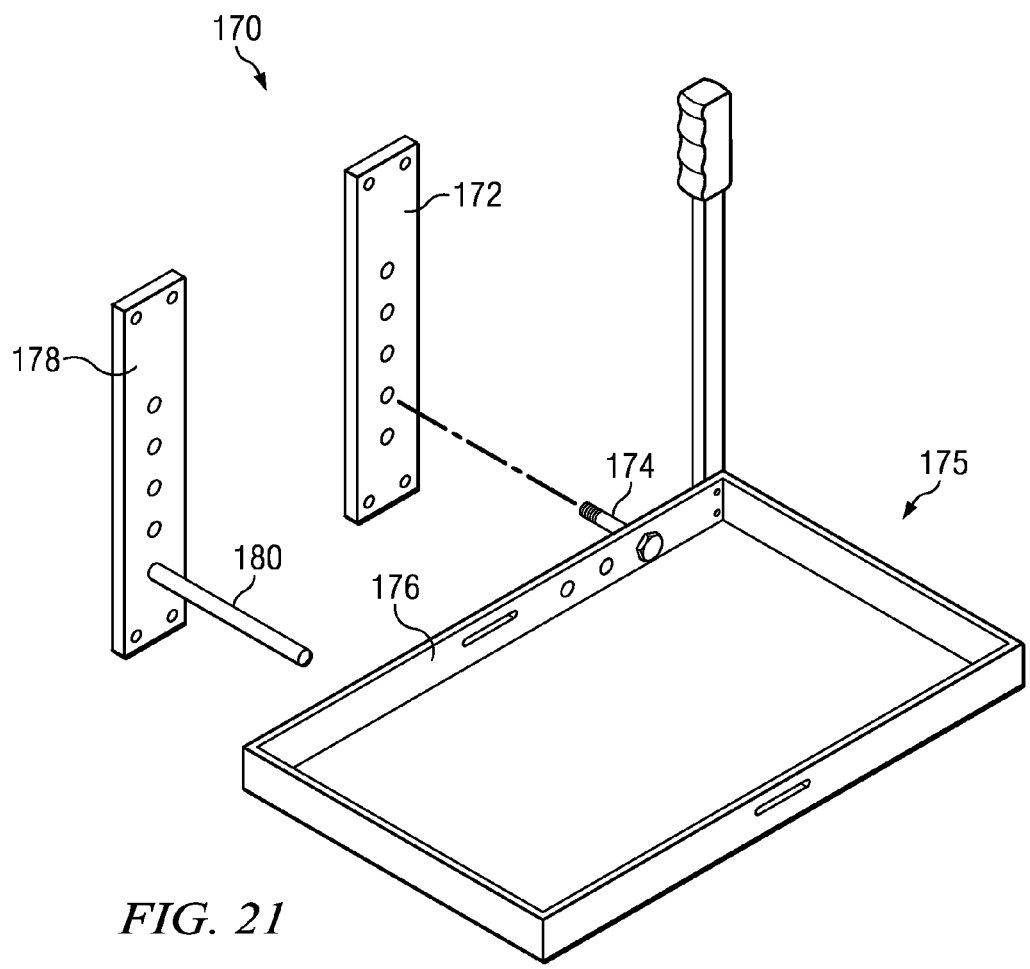
FIG. 21 is an isometric view of another embodiment of a fixture of the invention.

The embodiments of the various fixtures described above generally include a base plate to which the tray is rotatably mounted, and to which the rest member or stop is attached. Although the base plate serves an intended purpose, those skilled in the art may find that a simplified mounting arrangement can be envisioned. Stated another way, the tray can be rotatably mounted directly to a pole, a flat surface, a hand cart or other apparatus, without using a large rigid base plate. An alternative fixture 170 is illustrated in FIG. 21. Here, there is provided a first support member 172 including one or more holes therein for receiving the end of a bolt 174. The bolt 174 extends through a hole (not shown) in the side upright 176 of the tray 175 to thereby allow the tray 175 to pivot with respect to the first support member 172. The threaded end of the bolt 174 can be threadably fixed to the first support member 172. The tray upright 176, as well as the first support member 172, can have additional holes for selecting the appropriate location of pivotal movement of the tray 175 so that the container automatically return to a rest position when the container still has some fuel therein, or no fuel left therein.

A second support member 178 includes a lateral, horizontal member, such as a rod 180, upon which the rear end of the tray 175 rests when in a level or horizontal position. The rod 180 is threaded or otherwise fastened to the second support member 178. Again, there are a number of threaded holes formed in the second support member 178 to allow vertical adjustability of the rest member 180. Alternatively, the second support member 178 and the rest member 180 could be replaced with a single member formed or otherwise bent at a right angle.

The first and second members 172 and 178 can be fastened to a flat surface, or to a hand cart for transport and dispensing of fuel from a container secured to the tray 175. The first and second support members 172 and 178 can be attached between upper and lower cross members of a hand cart. Moreover, the first and second support members 172 and 178 can be attached to the left and right frame members of a hand cart. Other fastening adaptors can be employed to fasten the first and second support members 172 and 178 to different shaped parts of the apparatus to which it is desired to fix the fixture 170 thereto.

Figure 22:
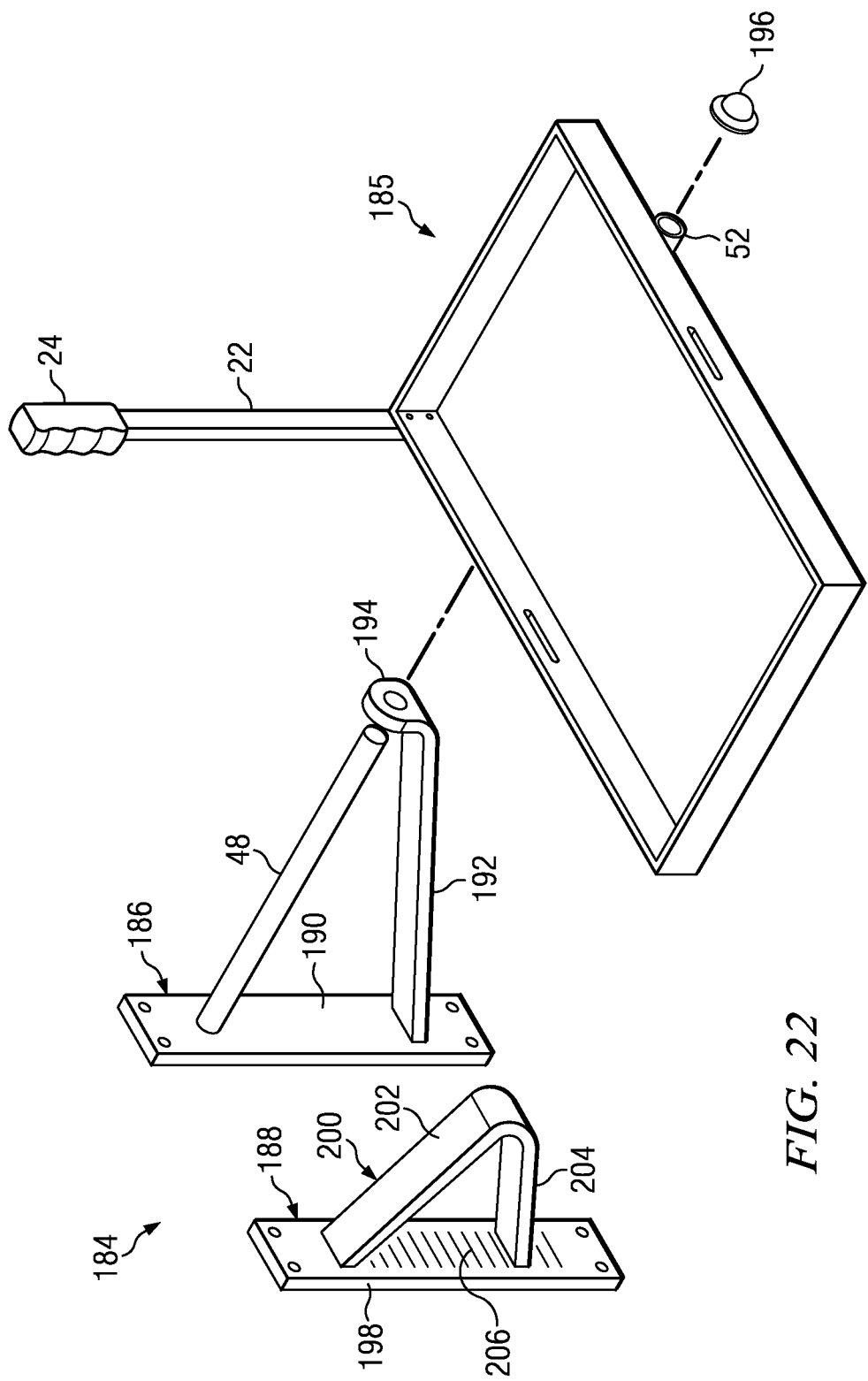
FIG. 22 is an isometric view of yet another embodiment of a fixture of the invention.

FIG. 22 illustrates yet another embodiment of a fixture 184 for securing a container 12 and for allowing pivotal movement of the container 12 during dispensing of liquid from the container 12. Included is a tray 185 with an elongate tubular member 52 (much like that shown in FIGS. 7 and 8) welded or otherwise fastened to the underside of the tray floor. The tray 185 can be constructed as described in any of the embodiments shown above, or even made different. The fixture 184 includes a first support 186 for pivotally supporting the tray 185. A second support member 188 provides a rest member upon which the tray 185 rests when not pivoted. Both support members 186 and 188 can be fastened to any suitable surface or apparatus, such as a hand cart or other mobile or stationary apparatus.

The first support 186 includes an axle rod 48 fixed at one end thereof to a vertical support member 190. An angle support member 192, with a lower end anchored to the vertical support member 190, includes a upright part 194 at its terminal end. The upright part 194 includes a hole therein through which the axle rod 48 extends after final assembly. During assembly, the angle member 192 is forced downwardly sufficiently so as to be disengaged from the end of the axle rod 48. Then, the tubular member 52 of the tray 185 is slid over the axle rod 48 until the end of the axle rod 48 extends beyond the end of the tubular member 52. Next, the angle support member 192 is forced upwardly until the hole therein is inserted over the end of the axle rod 48. Lastly, a push nut 196, or other type of keeper, is forced over the end of the axle rod 48 to fasten the components together for pivotal movement. Importantly, the angle support member 192 provides support for the tray 185 when loaded with a full container of liquid.

The second support member 188 can be constructed similar to a support such as used for a book shelf. To that end, the second support 188 includes a vertical support member 198. An angled member 200 has a horizontal rest part 202 and a support part 204, a bottom end of which engages the vertical support member 198. The ends of the angled member 200 can be adjustably fixed to the vertical support member 198. The ends of the angled member 200 can be constructed with tabs (not shown) which fit within lateral slots 206 formed within the vertical support member 198. Other methods of adjustability of the angled support member 200 can be employed by those skilled in the art. In addition, those skilled in the art may find it expedient to use a common base plate to which the axle rod 48, the angle support member 192 and the angle support member 200 are mounted, thus eliminating the individual vertical members 190 and 198.

The fixture 184 has the advantage of being situated generally under the tray 185 to provide support for the weight of both the tray 185 and a container 12 full of liquid. The supports 192 and 204 of the first and second support members 186 and 188 provide support to the ends of the respective axle rod 48 and the horizontal rest part 202.

Figure 23A:
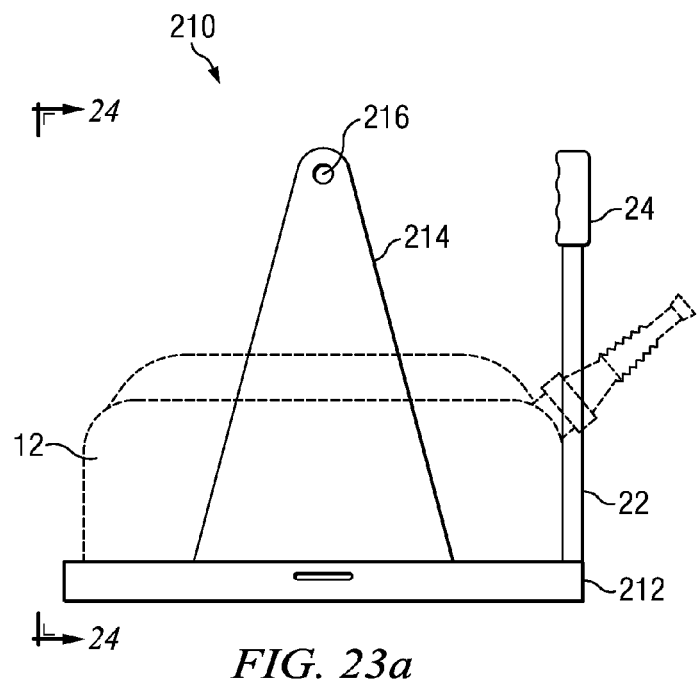
FIGS. 23a, 23b and 24 illustrate another embodiment of the invention, showing a fixture for securing a container therein, where the fixture has a swing arm.
Figure 23B:
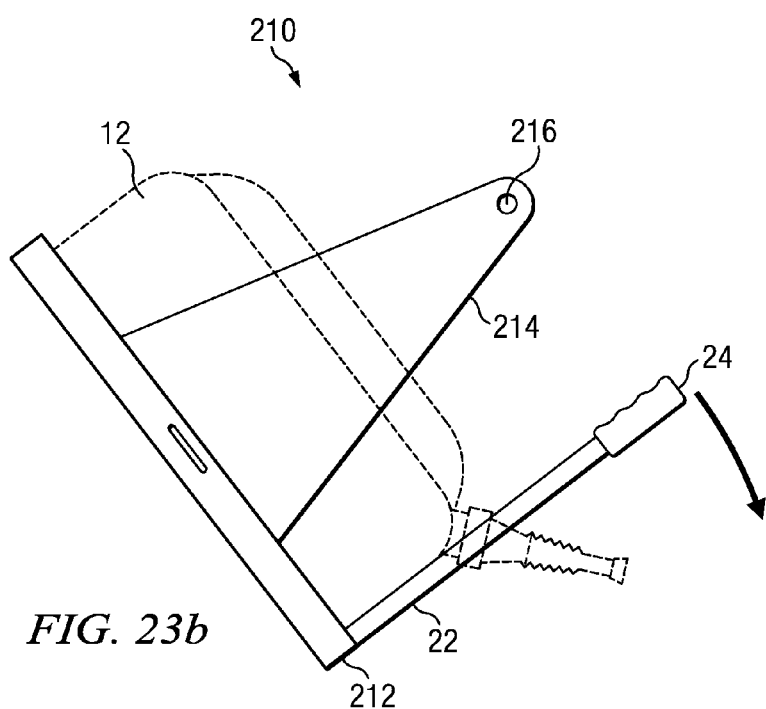
Figure 24:
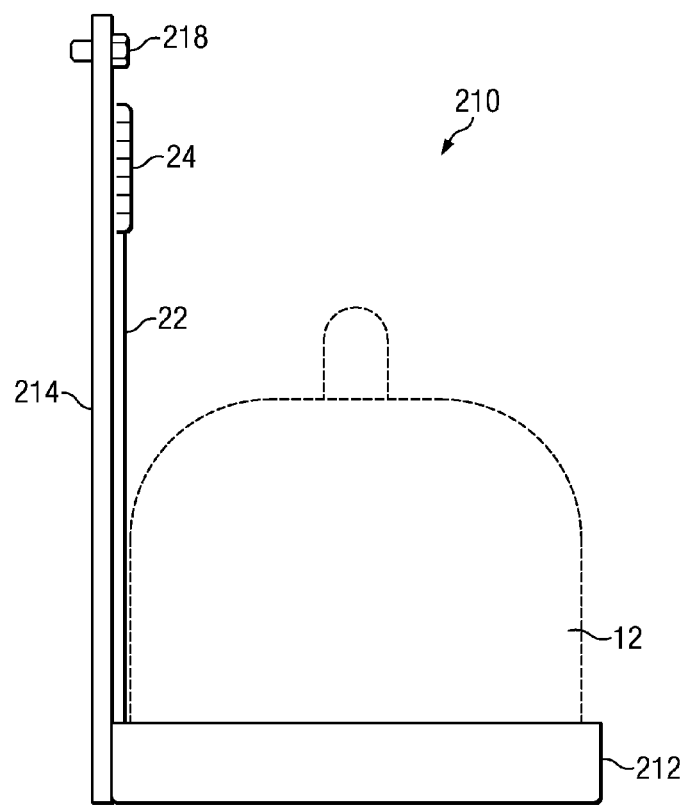

According to another embodiment of the invention, shown in FIGS. 23-24, is a fixture 210 to which a container 12 can be secured and pivoted for dispensing liquid therefrom. The fixture 210 includes a tray 212 fastened to a swing arm 214. The tray 212 can be any of the trays described herein. The swing arm 214 includes a pivot pin or hole 216 at a top end thereof. In the event of the use of a pivot hole 216, a bolt 218 or pin can be extended therethrough for allowing the swing arm 214, and thus the tray 212, to be pivoted or rotated therearound. A handle 22 and grip 24 are fastened to the tray 212 to facilitate manual rotation thereof around the pivot point 216. As in many of the other embodiments disclosed herein, if the tray 212 is rotated from its rest position shown in FIG. 23a, and the handle 22 is released by the user, the tray 212 will then return to the rest position. While not shown, a latch can be utilized to maintain the tray 212 in a rest position and prevented from rotation until released. A ratchet mechanism can also be employed to maintain the tray 212 in a tilted position, even if the handle 2 is released. The ratchet can be manually released when it is desired to return the tray 212 to the rest position. A ratchet mechanism can also be employed in the other embodiments of the fixtures disclosed herein. While a single swing arm 214 is illustrated, the fixture 210 can include a swing arm on opposing sides of the tray 212. In this alternative, the bolt 218 or axle rod could be longer, or each swing arm could be supported by hinge bolts 218 to respective spaced-apart stationary upright base plates (not shown).

Figure 25:
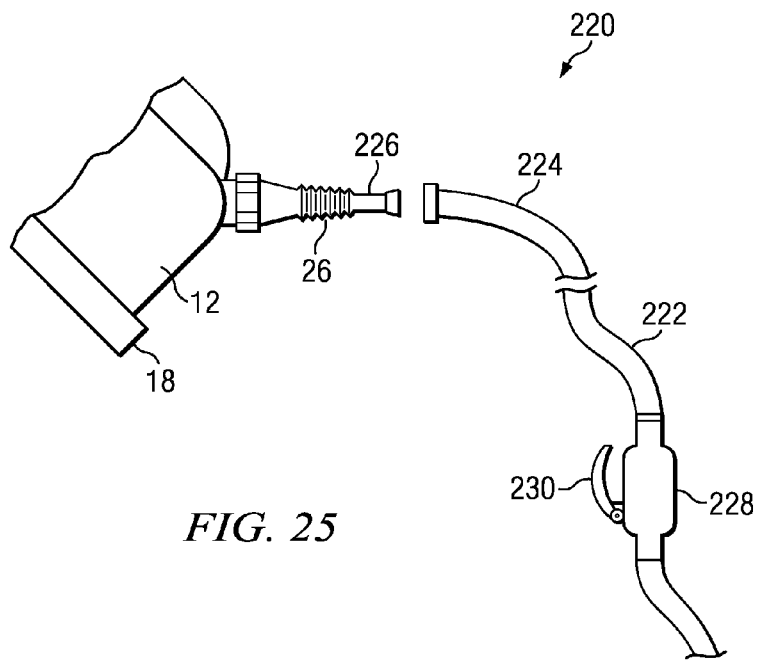
FIG. 25 illustrates a refueling hose and hand-operated nozzle for use with the containers.

In order to facilitate the refueling of a fuel tank, or for dispensing other liquids, a refueling arrangement 220 shown in FIG. 25 can be employed. A long flexible hose 222 with an end 224 can be used, where the end 224 is friction fit onto the end 26 of the spout 26 of the container 12. The hose 222 terminates in a lever-controlled nozzle 228. The lever 230 can be operated by the user of the invention to control the dispensing of fuel from the container 12. When the user determines that the fuel tank being filled is full or near full, the user can release the lever 230 to halt the flow of fuel even if the container 12 remains tilted. The nozzle 228 can be of simple design, much like that of a garden hose water nozzle. In order to prevent the escape of fuel vapors during refueling, the end of the nozzle 228 can include a threaded part or collar that rotates on the tubular end of the nozzle 228, but can be threaded into the threads of the fuel tank inlet being refueled. This fastens the nozzle to the fuel tank to be filled, but prevents escape of fuel vapors. In other situations, it may be beneficial to construct the end 224 of the hose with a threaded collar that mates directly with the threaded outlet of the container 12. Here, the spout 26 of the container would not be used during refueling. Indeed, in this situation, the hose 222 that threadably connects directly to the fuel container 12 could be larger than the spout 226, thereby allowing the refueling of the vehicle in a reduced amount of time.

Figure 26:
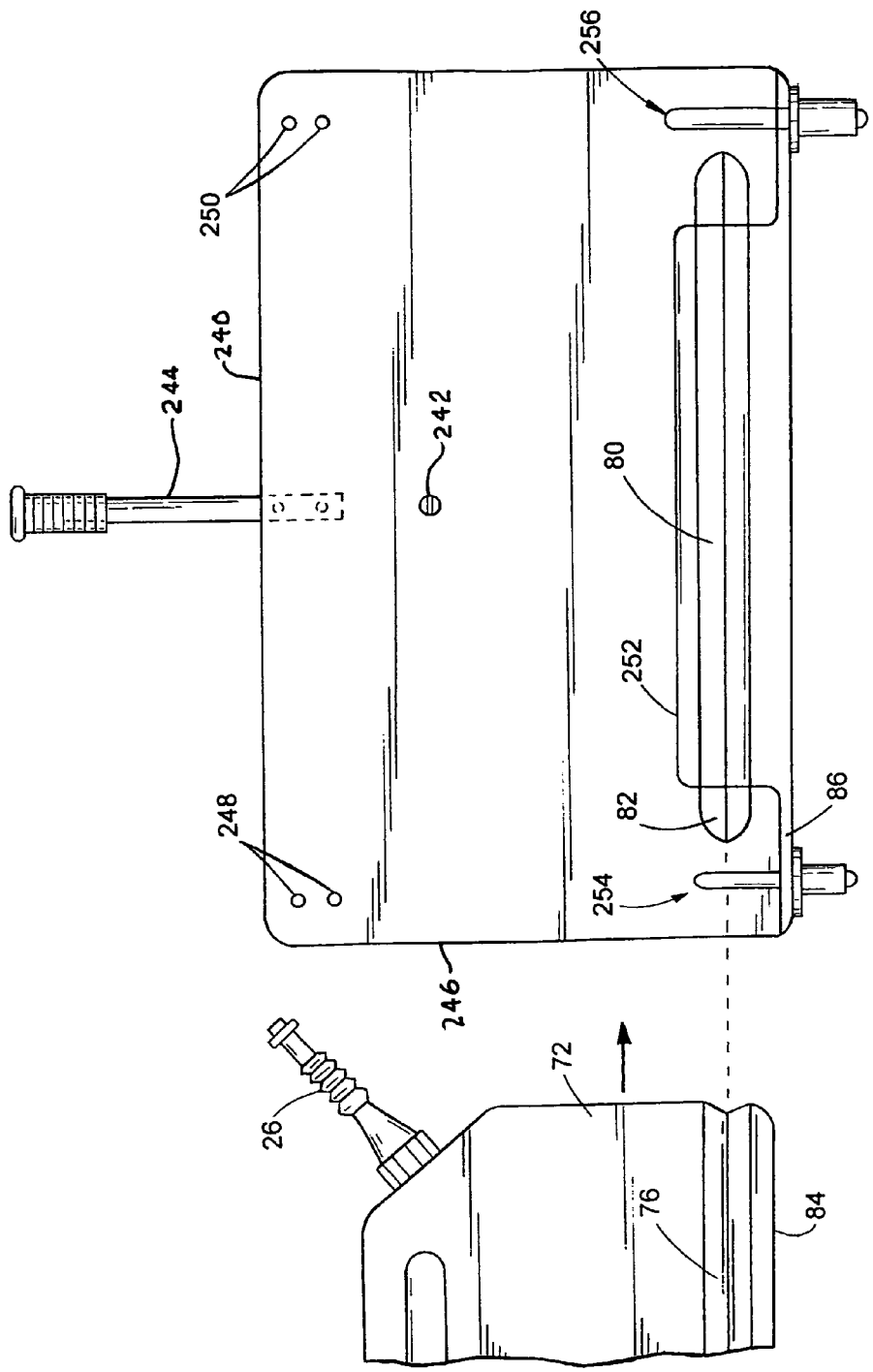
FIG. 26 is a side view of a pivotal tray with a gas container to be inserted therein.

In accordance with another embodiment, FIG. 26 illustrates a pivotal tray 240 that pivots about an axis 242. In this embodiment, the handle 244 can be mounted in a position centered on the mounting plate 246 so that the tray 240 can be tilted or rotated either clockwise or counterclockwise about the axis 242 of pivotal movement. According to this embodiment, the gas container 72 is constructed with a pair of elongate guide slots on two opposing sides thereof, one shown as numeral 76. The gas container 72 can be similar to that shown and described in connection with FIG. 11. The pivotal tray 240 is constructed with corresponding inwardly directed protruding guide rails 80 and 82 that mate with the guide slots 76 formed in the gas container 72. The gas container 72 can thus be slid into the tray 240 from either the right or left side of the pivotal tray 240 so as to become engaged with the inwardly directed guide rails 80 and 82. When fully engaged in the pivotal tray 240, the gas container 72 is supported so that it cannot fall out, even during the refueling process. As noted above, the shape of the guide slots 76 and the guide rails 80 and 82 can be generally triangular, circular, square, or any other suitable shape.

Importantly, the gas container 72 can be slid into the pivotal tray 240 with the spout 26 to the right to thereby fuel a gas tank located on the right of the pivotal tray 240. Similarly, the fuel container 72 can be slid into the pivotal tray 240 with the spout 26 to the left to thereby fuel a gas tank located on the left of the pivotal tray 240. The handle 244 can be grasped and pushed to the right or to the left to fuel gas tanks on either side of the pivotal tray 240. The mounting plate 246 can also be constructed so that the handle 244 can be mounted in bolt holes 248 on one side of the pivotal tray 240, or in bolt holes 250 in the other side of the pivotal tray 240.

The pivotal tray 240 is constructed with a bottom 86 having an outer upright lip 252 in which the protruding guide rail 80 is formed. As noted in FIG. 26, the upright lip 252 need not extend the entire length of the tray bottom 86.

According to a feature of the pivotal tray 240, opposing spring-loaded end stops 254 and 256 are provided to allow easy lateral insertion of the gas container 72 into the pivotal tray 240 until stopped by one of the stops 254 or 256. If the gas container 72 is slid into the pivotal tray 240 from the left, as shown in FIG. 26, then the left spring-loaded stop 254 will be manually depressed downwardly out of the way so that the gas container can be slid on the tray bottom 86 until stopped by the right spring-loaded stop 256. If the gas container 72 is slid into the pivotal tray 240 from the right, then the right spring-loaded stop 256 will be manually depressed downwardly so that the gas container can be slid on the tray bottom 86 until stopped by the left spring-loaded stop 254. Rather than manually depressing the spring-loaded stop during initial entry of the gas container 72 into the pivotal tray 240, the gas container 72 can simply be lowered onto the entrance spring-loaded stop to force it downwardly. The gas container 72 can then be slid laterally into engagement with the inwardly protruding guide rails 80 and 82 until stopped by the other spring-loaded stop.

It can be appreciated that those skilled in the art may prefer to employ only a single spring loaded stop at the entrance end of the pivotal tray, and use an upturned lip at the other end of the pivotal tray 240 as a fixed stop member. The gas container 72 can then be oriented with the spout 26 to the left or right, and then slid into the pivotal tray 240 until stopped by the fixed stop.

Figure 27:
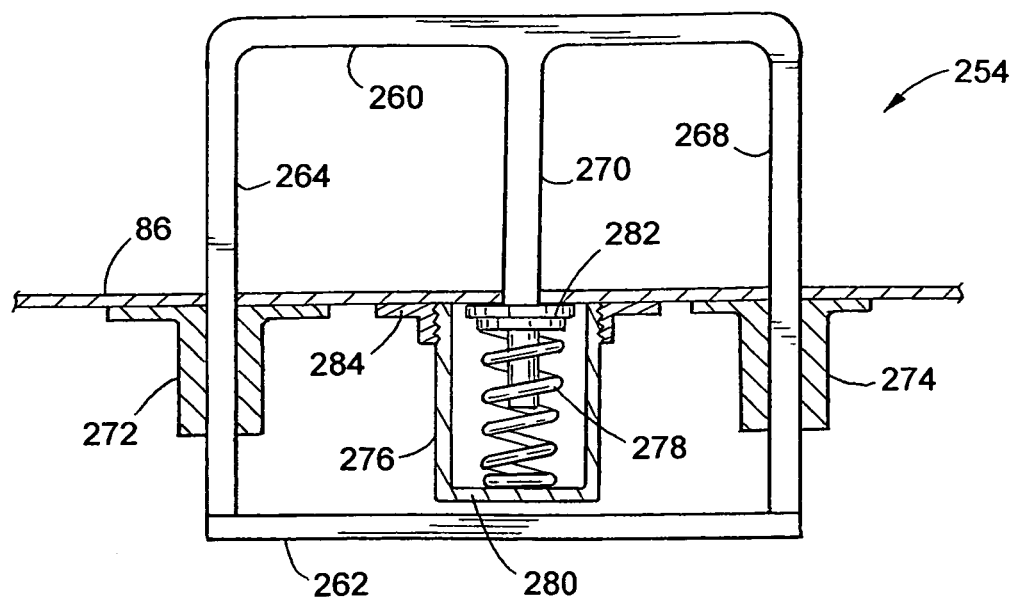
FIG. 27 is a frontal view of the spring-loaded stop of FIG. 26.

The spring-loaded stop 254 is illustrated in detail in FIG. 27. The bottom 86 of the tray 240 is constructed with three openings through which respective members of the stop 254 slideably protrude. According to one embodiment, the spring-loaded stop 254 is constructed with an upper lateral member 260, a lower lateral member 262, opposing vertical members 264 and 268, and a central member 270. The members 264, 268 and 270 can be formed as a single integral member, with the lower member 262 bolted to the opposing vertical members 264 and 268. Vertical cylindrical supports 272 and 274 are fastened or made integral with the tray bottom 86 to provide support to the spring-loaded stop 254 to withstand the lateral force when a container 72 full of fuel is pushed against the stop 254.

A cylindrical cap 276 is threadably fastened to the undersurface of the tray bottom 86. The cap 276 houses a spring 278 through which the central member 270 extends. The bottom end of the spring 278 abuts against a bottom 280 of the cap 276. The upper end of the spring 278 abuts against a spring stop 282, or the like, that is fastened to the center member 270. The spring stop 282 can be a snap ring snapped into a groove formed around the center member 270. Alternatively, the spring stop 282 can be a nut threaded onto a threaded part of the center member 270. Many other stop mechanisms can be employed as an alternative to the snap ring or nut. During assembly, the center member 270 is inserted through the central opening in the tray bottom 86, and the spring stop 282 is fastened to the center member 270. The spring 278 is inserted over the end of the center member 270 and then the cap 276 is screwed into a cap support 284. The bottom lateral member 262 can then be fastened to the opposing side members 264 and 268 using a pair of screws.

The other spring-loaded stop, if employed, can be constructed in a similar manner. As can be appreciated, the spring-loaded stop 254 is at rest when extended upwardly, under the force of the spring 278. However, the spring-loaded stop 254 can be manually depressed, or through the weight of the gas container 72, so that the gas container 72 can be slid into the tray guide rails 80 and 82. The bottom lateral member 262 of the stop 254 can also be used as a handle for grasping to pull the spring-loaded stop 254 downwardly, so that the stop 254 is generally removed from the path of the gas container 72 being slid into the pivotal tray 240. While not shown, the bottom 86 of the pivotal tray 240 can be constructed with a lateral depression therein, in which the top lateral member 260 can fit so that it is flush with the floor of the bottom 86.

While the spring-loaded stops 254 and 256 can be constructed in the manner described, other alternatives are possible. For example, a hinged member can be fastened to the bottom 86 of the pivotal tray 240. A portion of the hinged member can be hinged out of the way during sliding of the gas container 72 into the pivotal tray 240, and then hinged and locked to an upright position during transport and refueling operations. In addition, the stop can be constructed with a respective guide rail to be moved into a guide slot formed in the back of the gas container 72. A similarly-constructed frontal stop can be formed with a guide rail therein to engage within a guide slot formed in the front of the gas container 72.

The pivotal tray 240 can be fastened to conventionally available hand carts using mounting brackets and apparatus. Various brackets can be fastened to the back panel 246, and with the use of J-shaped bolts, can be fastened to the structure of the hand cart. Again, more than one pivotal tray 240 can be fastened to the front and/or back of a hand cart. Other fixed trays adapted for holding gas containers can also be fastened to the hand cart.

While the various embodiments of the fixture are adapted for tilting the container for dispensing a liquid and for return of the container to a rest position, such an arrangement is not necessary for the practice of the invention. The automatic return of the container to a rest position may be omitted, whereby the tray and container will remain in the tilted position even when the handle is released.

What is claimed is:

1. Apparatus for dispensing a liquid from a molded container of the type having a respective inwardly directed elongated slot molded in opposing sides thereof so that a contour of the slots is molded internal to the container, and a pouring spout, said apparatus comprising:
    a pivotal container holder adapted for holding the container, said container holder having a pair of opposing sides, each said opposing side of said container holder having a rail protruding therefrom, each said rail engaging within the respective inwardly directed slot of the container, the engagement between said container holder and the container constructed so that the container is pivoted when said container holder is pivoted, and the container can be removed from said container holder by horizontal sliding movement in a direction aligned with the container slots and said container holder rails;
    a first stop member and a second stop member;
    said container holder constructed so that the container can be slid horizontally in one direction into said container holder from a first end to a second end of said container holder until stopped by said first stop member, whereby the spout of the container is oriented toward said second end of said container holder, and said container holder is constructed so that the container can be slid horizontally in a direction opposite to said one direction into said container holder from the second end to the first end of said container holder until stopped by said second stop member, whereby the spout of the container is oriented toward said first end of said container holder; and
    said container holder adapted for pivotal movement so that the contents of the container can be dispensed from said first end of said container holder or from said second end of said container holder depending on whether the container is slid into said container holder from said second end or from said first end.

2. The liquid dispensing apparatus of claim 1, wherein the rails protruding from of each side of said container holder are elongated for slideably engaging within the respective inwardly directed elongated slots of the container, an axial length of said elongated rails is less than an axial length of the elongated slots.

3. The liquid dispensing apparatus of claim 1, further including in combination a wheeled cart to which said apparatus is adapted for attachment thereto.

4. The liquid dispensing apparatus of claim 1, further including in combination a wheeled cart to which a plurality of said apparatus is attached thereto.

5. The liquid dispensing apparatus of claim 1, wherein said container holder further includes a bottom, and wherein said first stop member and said second stop member are each moveable orthogonal to the bottom of said pivotal container holder, each said first and second stop member adapted for movement out of the way to horizontally slide the container into said container holder, and said first stop member is mounted adjacent said second end of said container holder, and said second stop member is mounted adjacent said first end of said container holder.

6. The liquid dispensing apparatus of claim 1, further including in combination said apparatus and the container.

7. The liquid dispensing apparatus of claim 1, wherein said container holder includes a bottom, and wherein said container holder is constructed so that the protruding rails do not extend to the first and second ends of said container holder bottom, whereby the container can be laid on an entrance portion of the bottom of said container holder and then pushed horizontally and forwardly a specified distance in either direction so that the protruding rails then engage within the respective elongated slots of the container.

8. The liquid dispensing apparatus of claim 1, wherein said container holder includes a bottom, and wherein said first and second stop members are each spring biased to respective positions protruding upwardly above said bottom so that when the container is lowered onto one said spring biased stop member said one stop member moves downwardly against spring bias so that the container can be slidingly moved forwardly into said container holder until a back side of the container clears said one spring biased stop member, whereupon said one spring biased stop member moves under spring bias upwardly and blocks backward movement of the container in said container holder.

9. The liquid dispensing apparatus of claim 2, wherein the spout of the container is located at a front end thereof and the slots extend to a back end of the container, and the rails protruding from the sides of said container holder are adapted for engaging in the slots at a back end of the container so that the container remains engaged with said container holder when the apparatus is pivoted to dispense the contents of the container from the spout.

10. The liquid dispensing apparatus of claim 5, wherein each said stop member is spring loaded so that said stop members extend upwardly in a respective rest positions, but can be pushed downwardly and out of the way during horizontal sliding of the container into said container holder from either direction.

11. The liquid dispensing apparatus of claim 6, wherein the elongated slots of said container each have one end open for receiving a respective said protruding rail, and an opposite end of each said elongated slot is closed to provide a respective stop member for a respective said protruding rail.

12. The liquid dispensing apparatus of claim 6, wherein each said elongated container slot is of the same given axial length, and each said protruding rail is shorter in length as compared to said elongated container slots, said elongated container slots are generally parallel to said protruding rails.

13. The liquid dispensing apparatus of claim 8, further including a handle for pivotally moving said container holder to dispense liquid therefrom, said handle located midway between said first entrance end and said second entrance end so that pivotal movement of said handle in one pivotal direction allows the container to be pivoted clockwise to dispense liquid to one side of said container holder, and pivotal movement of said handle in an opposite pivotal direction allows the container to be pivoted counterclockwise to dispense liquid to a different side of said container holder.

14. Apparatus for dispensing a liquid from a container of the type having a handle for carrying the container, a frontal spout and opposing sides, and two opposing side surfaces of the container each having an elongated indented depression that has an open end and a closed end, the elongated indented depressions are generally parallel to a bottom surface of the container, and each indented depression is formed in the respective side surface of the container, and each indented depresssion extends upwardly from the bottom surface and then inwardly, said apparatus comprising:

a first entrance end of said liquid dispensing apparatus for horizontally moving the container into engagement with said liquid dispensing apparatus, and a second entrance end of said liquid dispensing apparatus, opposite said first entrance end, for horizontally moving the container into engagement with said liquid dispensing apparatus;

a first stop located at the first entrance end of said liquid dispensing apparatus, said first stop removable from a horizontal entrance path of the container at said first entrance end, and said first stop movable to a stop position for abutting a back end of the container when the container is slideably and fully inserted into said liquid dispensing apparatus at said first entrance end to dispense the liquid at said second entrance end, whereby said first stop prevents the container from being moved backwardly in said liquid dispensing apparatus;

a second stop located at said second entrance end of said liquid dispensing apparatus, said second stop removable from a horizontal entrance path of the container at said second entrance end, and said second stop movable to a stop position for abutting a back end of the container when the container is slideably and fully inserted into said liquid dispensing apparatus at said second entrance end to dispense the liquid at said first entrance end, whereby said second stop prevents the container from being moved backwardly in said liquid dispensing apparatus;

said liquid dispensing apparatus mounted for pivotal movement to dispense the liquid from the container at either said first entrance end or said second entrance end, said liquid dispensing apparatus having a bottom surface on which the container rests when located in said liquid dispensing apparatus, and said liquid dispensing apparatus including opposite sides where each side extends upwardly from said bottom of said liquid dispensing apparatus; and a guide rail attached to each said opposite side of said liquid dispensing apparatus, said guide rails each protrude inwardly toward each other, and each said guide rail engageable within a respective indented depression of the container, the indented container depressions and said guide rails for guiding and holding the container in said liquid dispensing apparatus container holder, whereby the container is held in said liquid dispensing apparatus by the indented container depressions and said guide rails during pivotal movement of said liquid dispensing apparatus to empty the contents of the container.

15. The liquid dispensing apparatus of claim 14, wherein each said guide rail of said liquid dispensing apparatus is shorter than the bottom of said liquid dispensing apparatus as measured from said first entrance end to said second entrance end.

16. The liquid dispensing apparatus of claim 14, wherein said first stop and said second stop are spring biased to the respective stop positions, and the weight of the container full of liquid is effective to overcome the spring bias to move the first and second stops from the respective horizontal paths of the container when horizontally inserted into the liquid dispensing apparatus.

17. Apparatus for dispensing a liquid from a container of the type having a handle, said apparatus comprising:
- a pivotal container holder having a bottom adapted for supporting the container thereon, said container holder for carrying the container with it when pivoted, said container holder having a pair of opposing sides that are pivotal with said container holder, and said container holder constructed so as to be held in a horizontal rest position when not manually manipulated, and said container holder is pivotal clockwise about an axis from said horizontal rest position to pivot the container in one direction to dispense liquid in the one direction, and said container holder is pivotal counterclockwise about said axis from the horizontal rest position to pivot the container in an opposite direction to dispense liquid in the opposite direction;
- a guide slot and a guide rail arrangement slideably engageable together during horizontal insertion of the container into said container holder, said guide slot and guide rail arrangement positioned between the opposing sides of said pivotal container holder and the container so that the container becomes attached to said container holder to prevent lifting the container out of the container holder, said guide slot having at least one open end, said arrangement allowing the container to be slideably moved horizontally into and out of said container holder when said container holder is in said rest position, said guide rail moves relative to the guide slot as the container is inserted into said container holder, and said guide rail moves out of an open end of said guide slot as the container is removed and free from said container holder; and
- a movable stop engageable in the bottom of said container holder and located at an entrance end of said container holder, said stop for engaging a back of the container after the container has passed beyond the entrance end to prevent removal of the container once inserted into said container holder, said stop removable from engagement of the back of the container and the path of the container when the container is being removed from said container holder.

18. The liquid dispensing apparatus of claim 17, further including in combination a wheeled hand cart to which said apparatus is attached, said wheeled cart adapted for transporting with it said apparatus and the container full of liquid to dispense the liquid to one side of the wheeled hand cart by pivoting the container holder clockwise, or to dispense the liquid to an opposite side of the wheeled hand cart by pivoting the container holder counterclockwise.

19. Apparatus for dispensing a liquid from a container of the type having opposing sides and an elongated inwardly oriented surface formed in at least one said side surface, and a pouring spout, comprising:
- a wheeled cart having two wheels rotatable about a common axle, said two wheels for supporting an entire load carried by said wheeled cart during transportation, and said wheeled cart having a frame carried by said two wheels;
- a container holder mounted for pivotal movement to a frontal side of said cart frame, said frontal side being on a side of the frame facing a direction of travel of said wheeled cart, a pivotal axle of said container holder is perpendicular to the common wheel axle of said wheeled cart, and the pivotal axle of said container holder is fixed against movement with respect to the common axle of said wheeled cart except for pivotal movement, said container holder pivotally movable clockwise about said pivotal axle from a horizontal rest position to a right side of said wheeled cart, and said container holder pivotally movable counterclockwise about said pivotal axle from the horizontal rest position to a left side of said wheeled cart;
- said container holder constructed with an inwardly oriented surface for engaging the inwardly oriented surface of the container to constrain the container from being lifted upwardly out of said container holder when in the horizontal rest position, but allowing the container to be inserted horizontally into said container holder;
- a stop mechanism for preventing the container from sliding out of said container holder during pivotal movement of said container holder when dispensing liquid from the spout of the container to either the right side or the left side of said wheeled cart;
- a handle attached to said container holder for pivotally moving said container holder and the container constrained therein from the horizontal rest position clockwise to dispense the liquid from the container spout to the right side of said wheeled cart, and said handle for pivotally moving said container holder and the container constrained therein from the horizontal rest position counterclockwise to dispense the liquid from the container spout to the left side of said wheeled cart; and
- whereby said wheeled cart can be wheeled to carry the container to a destination where said handle can be moved to pivot both said container holder and the container clockwise as viewed from a front of said wheeled cart so that the liquid can be dispensed to the right side of said wheeled cart, and said handle can be moved to pivot both said container holder and the container counterclockwise as viewed from the front of said wheeled cart so that the liquid can be dispensed to the left side of said wheeled cart.

20. The liquid dispensing apparatus of claim 19, wherein said container holder is constructed with a bottom platform on which the container is horizontally slid during insertion of the container into said container holder when in the horizontal rest position, and the container is constrained from said upward removal from said container holder by a portion of the container side being engaged with the inwardly oriented surface of said container holder.

21. The liquid dispensing apparatus of claim 19, wherein said container holder is constructed with spaced apart sides, and each said side includes an inwardly oriented surface, and the container is constructed with opposite sides, and each said container side includes an inwardly oriented surface.

* * * * *